(12) United States Patent
Zhang et al.

(10) Patent No.: US 11,089,808 B2
(45) Date of Patent: *Aug. 17, 2021

(54) VEGETABLE WASHING METHOD CAPABLE OF SEPARATING AND SPLITTING IMPURITIES, AND MACHINE FOR IMPLEMENTING SAME

(71) Applicant: Qisi Zhang, Dongguan (CN)

(72) Inventors: Qisi Zhang, Dongguan (CN); Weiwen Zhang, Shantou (CN)

(73) Assignee: Qisi Zhang, Dongguan (CN)

( * ) Notice: Subject to any disclaimer, the term of this patent is extended or adjusted under 35 U.S.C. 154(b) by 34 days.

This patent is subject to a terminal disclaimer.

(21) Appl. No.: 16/544,073

(22) Filed: Aug. 19, 2019

(65) Prior Publication Data

US 2019/0380374 A1    Dec. 19, 2019

Related U.S. Application Data

(63) Continuation-in-part of application No. 14/786,987, filed as application No. PCT/CN2014/000430 on Apr. 21, 2014, now Pat. No. 10,383,353.

(30) Foreign Application Priority Data

Apr. 25, 2013   (CN) .......................... 201310147707.0
Apr. 25, 2013   (CN) .......................... 201320216259.0

(51) Int. Cl.
| | |
|---|---|
| A23N 12/02 | (2006.01) |
| B08B 3/04 | (2006.01) |
| B04C 3/06 | (2006.01) |
| A23L 5/20 | (2016.01) |
| A47J 43/24 | (2006.01) |

(52) U.S. Cl.
CPC ................ *A23N 12/02* (2013.01); *A23L 5/20* (2016.08); *A47J 43/24* (2013.01); *B04C 3/06* (2013.01); *B08B 3/047* (2013.01)

(58) Field of Classification Search
CPC .... A23N 12/02; A23N 12/023; A23N 12/086; B08B 3/045; A47J 43/24; A23L 19/00
See application file for complete search history.

(56) References Cited

U.S. PATENT DOCUMENTS

| | | | |
|---|---|---|---|
| 2,962,886 | A | 12/1960 | Johnson |
| 5,562,114 | A | 10/1996 | St. Martin |
| 5,904,090 | A | 5/1999 | Lillelund |

(Continued)

FOREIGN PATENT DOCUMENTS

| | | |
|---|---|---|
| CN | 2829383 Y | 10/2006 |
| CN | 1931036 A | 3/2007 |

(Continued)

*Primary Examiner* — Natasha N Campbell

(57) ABSTRACT

A method for cleaning fruit and vegetable ingredients is provided, in which the washing basket assembly agitates the water in the washing barrel to rotate upward to achieve the cleaning of fruit and vegetable. During the process of "cyclic cleaning in the barrel", the drainage outlet in the center of the bottom of the washing barrel is closed to prevent the water from flowing out of the barrel cavity; when the drainage outlet in the center of the bottom of the washing barrel is opened and drained, the water body rotates to form eddy current drainage; fruits and vegetables in the washing basket alternately move centripetally and centrifugally. The number of exercises is proportional to the number of washes.

14 Claims, 18 Drawing Sheets

(56) References Cited

U.S. PATENT DOCUMENTS 6,578,590 B2    6/2003  Leblond
2006/0078661 A1    4/2006  Wang

FOREIGN PATENT DOCUMENTS

| CN | 101099596 A | 1/2008 |
|---|---|---|
| CN | 101375773 A | 3/2009 |
| CN | 201585902 U | 9/2010 |
| CN | 102273958 A | 12/2011 |
| CN | 202232899 U | 5/2012 |
| CN | 104116123 A | 10/2014 |
| CN | 104116427 A | 10/2014 |
| DE | 2822942 C2 | 8/1986 |
| WO | WO2014/173180 A1 | 10/2014 |

VEGETABLE WASHING METHOD CAPABLE OF SEPARATING AND SPLITTING IMPURITIES, AND MACHINE FOR IMPLEMENTING SAME

TECHNICAL FIELD OF THE INVENTION

This invention relates to a kind of washing method for fruits and vegetables and a vegetable washer which applies the washing method. In particular, the method and machine can separate different impurities from the fruits and vegetables to different space in the washing process.

BACKGROUND ART OF THE INVENTION

First, let us learn about the impurities in the unwashed vegetables: Group A impurities are invisible impurities such as pesticides, viruses, bacteria and the like that remain on the surface of fruits and vegetables; Group B impurities are visible substances attached or included and of a relative larger proportion, such as sand, grit or mud and etc.; Group C impurities are visible substances attached or included but of a relatively smaller proportion, such as stale leaves, weeds, hair, insect etc., which are included in vegetables.

Second, let us analyze how the process of traditional manual washing of vegetables remove the three categories of impurities. Prepare two bowls. First, put water in the first bowl until the bowl is full, and put fruits and vegetables into the water and allow soaking for an appropriate time so that the Group A impurities would be dissolved in the water, then put a hand into the water, grab a handful of vegetables and constantly make the motion of turning, up and down shaking and left and right shaking in the water so as to make the Group B impurities fall into the water from the gap of the vegetables, and to make the Group C impurities detach from the gap of the vegetables (but the vegetables and impurities still coexist in the same bucket), therefore the separation of vegetables from Group B impurities and Group C impurities are realized, (this article will define the breaking the clamping force of the attachment of impurities and the loosening of impurities at the surface of vegetables, as spin-off, which is also known as X operation), then grab one handful and repeat the above steps until all the vegetables in the bowl were being operated for one time, and at this stage, half of the whole process of washing vegetables is completed. At this moment, the vegetables and the three kinds of impurities still coexist in the same bowl. Then, put the hand into the water several times, each time take up a handful of vegetables, dipping in the water surface continuously and moving above the water to dry, and then put them into the second bowl, repeat until the vegetables in the first bowl are completely transferred to the second bowl while the three kinds of impurities and water are still in the first bowl, thus the step of separately placing the vegetables and the Group B and Group C impurities are realized (which is referred to as splitting, also known as Y operation). At this point, the second half of the whole process of washing vegetables is completed.

$$X \text{ operation} + Y \text{ operation} = \text{the complete process of washing vegetables.}$$

Obviously, we can pour away the water and impurities in the first bowl and then fill a full bowl of water and repeat (X operation+Y operation), to conduct the second time of washing of the vegetables. In fact, washing vegetables in our daily life is also the process of repeating X+Y operation by changing the water many times.

Now, can we wash the vegetables if we just do X operation without Y operation? Further to the above example, after the completion of X operation in the first bowl, a pump is used to draw the water in the first bowl instead of moving the vegetables to the second bowl for Y operation. By doing so, vegetables and Group A, B. C impurities coexist in the same bowl and are mixed together.

This shows that, without Y operation. Group B and C impurities would not be removed completely. Without Y operation, vegetables cannot be washed clean no matter how many times of X operation are repeated, strictly speaking, only half are washed, the vegetables are not washed completely.

The development history of the vegetable washer is reviewed as follows.

The earliest vegetable washer does not have mechanical moving parts, hereinafter referred as static vegetable washer. The purpose is to degrade pesticide residues in fruits and vegetables. The method comprises putting through the water and ozone in a closed container and placing the fruits and vegetables in the ozone-dissolved water for an appropriate time, using the strong oxidation of ozone $O_3$ to cause the decomposition of pesticide residues in fruits and vegetables on the surface to dissolve in water, and then poured out with the water. As the purpose is to wash off pesticide residues and impurities on the surface of vegetables, namely Group A impurities, and such vegetable washer still sells widely and is still popular.

Later, Chinese Patent No. CN912 008 210 discloses a vegetable washer with a mechanical movement, hereinafter referred as dynamic vegetable washer. It discloses a solution comprising: setting the washing-basket in the washing-bucket with closures (in the original text of Chinese Patent No. CN912 008 210, the washing-basket is named as 'permeable inner bucket', while the washing-bucket is called outer bucket. In order to specify the description and avoid confusion, washing-basket and washing-bucket will be the terms used); wherein bottom of the bucket is planar or quasi-planar; a shaft extends from the central surface of bottom of the bucket; the peripheral of the bucket is provided with a water inlet and the outlet; the body shell features a motor and an electronical control device, which drives washing-basket to rotate; the upper surface of the washing-bucket is a waterproof panel. When use, the fruit and vegetables are placed into the washing-basket, washing-basket is rotated by the motor, thereby spinning the water flow by the centrifugal force within the washing-basket. The spun water flow may rise over the basket and then fall back to the washing-basket. The movement of the water flow will clean the vegetable and spit the impurities out from the vegetables, which is a completion of X operation.

The above-mentioned Chinese patent No. CN912 008 210 has been published for over 20 years.

Incidentally, now commercially available dynamic vegetable washers mostly comprises any one of ozone generator, ultrasonic generator, ultraviolet generator, or a plasma generating device.

There is another vegetable washer of existing technology, which comprises a motor installed on the top cover of the washing-basket. The structure of the washing-basket is a long shaft with a rod in the bottom center, and the axis coordinates with output axis of the motor under the lid of the bucket. The bottom surface of the bucket has the shaft seat raised, the shaft seat coordinates with the recessed hole in the bottom surface of the washing basket, and as support for the washing-basket (see FIG. 23 and FIG. 26).

See FIGS. 22, 23, 24, 25, 26, features of the two vegetable washers of the existing technology are:
1, No function of the division of Group B and Group C impurities and no division space.
2: Set shaft 102 in the bottom center of the washing-bucket (see FIG. 22 and FIG. 25) or convex shaft 202, see FIG. 23 and FIG. 26.
3: The outfall is set only around the bottom in the washing-bucket.
4: On the drainage method, there is no way to use the spinning suction from the center of the vortex to discharge pollution.
5: The bucket shaft through the shaft 102 in the center of the bottom of the washing-basket or the shaft 202 as support for the washing-basket (positing a sleeve 104 on shaft 102 in order to increase the bearing surface.)
6: The bottom of washing-bucket is flat or quasi plane.
7: The structure of the center bottom at the basket's is protruding fit convex platform (FIG. 22 and FIG. 25) or protruding rod long axis (FIG. 24 and FIG. 26).
8: The opening of the washing-basket is widely open.

Because the vegetable washer of the existing technology has these, structural features, after using it to wash vegetables, there are the following three problems.

The first problem, no matter how many times the vegetables have been washed, Group C impurities still remain. Because: Group C impurities were thrown from the basket with the water cycle, rising to the top of the basket as the gap with the water bucket, but falling back to the vegetables in the basket with the water falling (if we call the water drops as spray, then spraying water down, while the impurities are spraying to the basket), so no matter how many times the vegetables have been washed, Group C impurities still remain. Group C impurities cannot be removed in the prior art.

The second problem, part of Group B impurities are mixed with vegetables, some accumulated in the bottom of the bucket around the center of the bucket shaft 102 and were not discharged. Because: during draining, the water flow no longer did upward motion along the gap between buckets and baskets with the reduction of water, and Group B impurities were so heavy that it sank to the bottom of the bucket, and gradually rotated to the bottom center of the bucket by the water rolling, to gather around the center axis of the bucket. Precisely the center bottom of the bucket of the vegetable washer of the existing technology is a rotary axis, and the drain can only be set in around the bottom of the bucket, so these Group B impurities cannot be drained. Many consumers are not aware of this problem because the sleeve mounted to the shaft under the basket blocks the line of sight. Part of the Group B impurities remain in the bottom of the bucket portion, partly mixed in vegetables removed by the user. Small parts are discharged from the drain opening by the bucket with the water falling. That is to say, the Group B impurities and vegetables are still mixed in a bucket after being washed one time. When water is put into the bucket and the machine is started again, the Group B impurities in the end of the bucket participate in the movement of water cycling up and down.

The third problem, there exists dead corner of cleaning, which is not conducive for the vegetables thoroughly cleaned. Because in the process of washing vegetables, no matter how many times we change the water or how many times we washed in water, the vegetables in the cleaning process has been relatively concentrated near the side wall in the washing basket, without a circumferential movement (e.g. the circumferential movement refers circumferential movement relative to the basket) also without a centripetal movement. Also no eccentric movement again (except the vegetables being thrown to the periphery of the washing basket). That is to say, when the vegetables are being flushed by the flow of washing water, the surface which faces to the washing water will not change. In addition to the fixed flushing angle (because the flow of washing water is circulated in a fixed path), there could be dead corner which is neglected in the flushing. This is not good for cleaning the vegetables thoroughly and reduces the cleanliness.

In other words, the existing commercially available vegetable washer has just finished washing vegetables, but not finished the Y operation, and also cannot solve the problem of flipping fruits and vegetables in X operation, so strictly speaking, even X operation is not fully completed. Overall, probably only 40% of the whole process is completed. After washing vegetables with this vegetable washer, pesticide residues may be dissolved into the water with the water drained away due to the action of ozone, and solve the degradation and removing of the Group A impurities, but Group B impurities such as weeds, insects, rotten leaves, stale leaves, hair and etc. are still mixed with vegetables in the basket, not being separated from vegetables; Group B impurities, such as sand, grit and mud, gather in the central portion of the washing-bucket and is partly mixed in vegetables, and would not discharge with the water. When the second time putting water to wash vegetables, came along with the irrigation of the vegetable washer and rotation of the washing-basket, the sediment is connection with vegetables in the bucket, cannot be split, still need wash several times artificially to complete the Y operation. That is to say, it does not really achieve less work by the use and cannot entirely complete the whole process of washing vegetables by machines (X+Y operation). Strictly speaking, it cannot be called vegetables washed up, but only say that of half, or even less than half (due to the vegetables are not fully flipped, existing blind angle, which makes the degree of washing to clean compromised.)

These three problems are the reason that the vegetable washer can't be widespread for a long time. Consumers who were not aware of these problems may buy this machine. The consumers who bought this kind of machine and found the three problems after using the machine would not recommend their relatives and friends to buy the machine.

If you want to manually complete Y operation without solving the three problems, the dynamic vegetable washer exists meaningless. For example, in the cold winter, people have to manually wash vegetables once or twice after washing them by the vegetable washer, but still cannot avoid the hand being soaked into the icy water; another example is that a fashionable lady, who paints her nails red, still cannot achieve washing vegetables without removing her makeup; another example, on some important occasion where people must eat raw vegetables in Western, people still cannot avoid risks of infectious disease from hand washing vegetables and hand touching vegetables.

If these three problems can be solved, all the impurities in vegetables could be removed.

How to solve the three problems, which has been troubled the industry of vegetable washer for not being solved in the past 20 years. Both researchers and manufacturers are trying to solve these three problems of the existing vegetable washer, in order to complete the whole process, the X+Y two operations, of washing vegetables completely by the vegetable washer.

SUMMARY OF THE INVENTION

To solve the above three problems of the existing vegetable washer, complete the entire process of washing vegetables by a machine, which includes the X operations and Y operations, the present invention discloses the method of washing vegetables, which can split, separate and divide the impurities, and the machine which implement the method. This machine is also called vegetable washing machine with impurity retainer and central sewage disposal. This machine solves the above three technical problems of existing vegetable washing machines. The machine of this disclosure has a simple structure, low cost, clever methods, remarkable effects, and has qualitative leap in the field. This is not a word of propaganda, but it is well-founded, for the following reasons. At the first, there are four kind of substances, including three impurities (i.e. Group A, Group B, and Group C impurities) and the vegetables in the basket. After washing, the four kinds of substances were automatically classified into four different spaces. The classification is as exact as the recognition of the human eye, or like the human hand picks it out. This is the so-called remarkable effects. The real realization can be that the vegetables in the basket are poured directly into the pan and fried, instead of the impurities and vegetables being poured into the pan and fried together. The reason why the method is clever is because to achieve such a significant improvement, there is no need to add a lot of complicated machinery, nor does it need a lot of cost.

The washing method of washing vegetables, which can split, separate and divide the impurities in the invention, comprises the following steps: put fruits and vegetables into the a water-permeable washing-basket in the washing-bucket with a sealing cover, wherein the washing-basket is driven by the motor to rotate such that the water is forced to be flung from inside of the washing-basket to the gap of the basket and bucket by the centrifugal force, then rise to the top of the basket, and blocked and sucked down back into the basket; then, be flung to the gap of the basket and bucket by the centrifugal force again, like this cycling flow, each cycle of every stream of water goes through the gap of the vegetables in the basket, to form rapidly relative motion with the surface of the fruit and vegetable, and form friction, to destroy impurities attached to the surface of vegetables that is to be washed, and loose the clamping degree of vegetables to impurities. The present invention is characterized in that, this method has the following three technical features of A. B and C at the same time, or at least one of the following three technical characteristics A and B and C.

Feature A uses the method of "preventing the impurities flung out of the basket with water to cycle and fall down back into the basket with water" to clean the vegetables in the basket gradually. The subordinate concept of this method includes the method of "adding dense sieve in the way of water's falling to retain impurities that was brought to the mouth above the water and let the water continue to fall through the sieve.

Feature B uses a "vortex center draining" method to discharge the sewage and impurities; The subordinate concept of this method includes the method of by: (1) opening a drainage outlet the center of the bottom of the washing-bucket and rotating to wash the basket and (2) draining off water at the same time to implement draining contamination. So the opening of drain-pipe in the center of the drain in the bottom of the bucket is also the vortex center, where the water makes strong rotation to get the exclusion of impurities, especially the heavier Group B impurities such as sediment which accumulates at the center of the bucket due to the rotational movement of water while the water level drops. The stated the opening of the draining off water and sewage in the center bottom of the washing-basket is a center opening of the draining off water and sewage which can be closed and opened, and the stated washing-basket is a basket that without shaft to be connected to the center of the bottom of the bucket; in the washing-bucket there is a special supporting device to support washing-basket and special positioning device to limit the washing-basket's position and a special transmission mechanism will pass torque to the washing-basket. The term "special" refers to "not occupying the bottom center of the washing-bucket", or "neither occupying the bottom center of the washing-bucket nor occupying the bottom center of the washing basket", and not hindering the arrangement of the drainage outlet at the bottom center of the washing-bucket.

Feature C is the method of flipping and turning the placement angle of the fruits and vegetables in the washing-basket, is making the vegetable in the washing basket periodically centripetal and centrifugal motion; Because of the above stated opening of central in the bucket drain contamination, uses the water flow centripetal motion in the process of water draining to drive fruits or vegetables to flip and scroll to basket center, and next time when the washing-basket completes taking water and the washing-basket begins to rotate or scroll, using centrifugal force to force fruits and vegetables to flip and scroll to the edge of the basket, to achieve full rolling and flipping once more, so as to imitate effects of human flipping fruits and vegetables in the water. Like this every time water is changed, each vegetable is placed to another angle and changed to another face as the face of the water. And this flip is done every time after we change water and is unlike the violence when washing clothes in the washing, so it will not cause harm to fruits and vegetables. In a more than 20 minutes process of washing vegetables, you may need to change the water 4-5 times, there will be 4-5 times the dish turned a switch, for a different display angle, and there are 4-5 different positive sides, and the problem of the dead exists in washing vegetables in the existing technology is solved. The stated three features of methods, feature A, feature B and feature C can exist in one vegetable washer at the same time, or there are only one or two of the three exist in one vegetable washer.

Of course, only when three features are equipped the vegetables can be cleaned thoroughly to the highest degree. Moreover, feature A is the prerequisite technical of feature B. If there is no feature A but feature B, then because the problem that the Group C impurities are not split and collected is not resolved, the Group C impurities will be taken into sewage pipes clogged sewage by the vortex, that is to say, the setting of filter in the basket port is the prerequisite technical of central sewage. If there is no feature B but feature A, then because the problem that the Group B impurities are not split and collected is not resolved, the invention's purpose, clean and remove impurities completely, cannot be completed, too. That is to say. In other words, A and B mutually cooperate to work.

As we all know, in the vegetable washer, the cross-section of bucket chamber of the washing-bucket and the cross-section of the washing-basket is a pair of concentric circles, so shaft of the washing-basket naturally goes through the center of the concentric circles. So, in the center of the bottom of the bucket of the vegetable washer in the existing technology sets up rotation axis penetrated upward (see FIGS. 22 and 25) or in the center bottom of the bucket located pedestal (see FIGS. 23 and 26) is also a matter of course, and nothing wrong; this set is a necessarily association of technician in this technical field. And the innovative thinking and creative work of the present invention lies in abandoning the often irrational and conventional program.

Open an outlet in the center bottom of bucket filled with water, and the sewage effect has been improved essentially. If coupled with the bottom of the bucket as funnel-shaped, Drain thoroughly.

As we all know, all the vegetable washers in the existing technology stress washing vegetables by spraying, called "spray technology", which emphasizes water returns from above and falls off in the washing-basket, and falling off in the washing-basket mainly plays the role of washing vegetables, but in fact, this is a technology bias. This technology bias guides people try to open the mouth of the basket, and cannot have the cover so as not to slow down the falling speed of the water flow and affect the placement of water, while the present invention is on the contrary, and overcomes this technical prejudice, located in export processing basket dense filter which accumulated a great deal of Group C impurities and some Group B impurities, objectively slowing the flow rate and affecting the placement of water which is random and irregular (affected to the distribution of impurities detained). But the washing effect improved significantly.

The method of washing vegetables that can split and separate impurities in this invention, can also be added with the following technical features: providing a funnel-shaped bottom which is wide at the top and narrow at the bottom to guide impurities to the center, thereby strengthening the vortex flow on discharge of impurities; rotating blade can be arranged within the funnel-shaped chamber to strengthen the effect of driving water. The rotating shaft of the washing-basket extending downwardly may serve as the rotating shaft of the blade. Preferably, the bottom of the washing-basket may be flat or hopper.

The method of washing vegetables that can split and separate impurities in this invention, can also be added with the following technical feature: By making the bottom of the bucket into the low-center high-around and funnel-shaped to enhance the impurities to gather to the center, and this device is called the filter under the basket; of which the skeleton can be used as a supporting member of the basket, or not the support member. The density degree of meshes of the filter is to be able to prevent large leaves passing and without hampering the sediments passing and discharge, within this range the meshes' size is changeable, preferably between aperture 2 mm to 5 mm.

The method of washing vegetables that can split and separate impurities in this invention, can also be added with the following technical feature. Motor drives the washing-basket to rotate, power of the motor may be transmitted to the basket from any position of the basket, and can be passed to the basket from above or below or side to the basket. When passing from the top to the basket, one of the passing method is-selectively using the filter's skeleton in the basket's port as a transmission member, or may not choose to use the filter's skeleton in the basket's port as a transmission member.

The machine of the method of the present invention is a kind of vegetable washer that can split and separate the impurities in vegetables, including the basket in the washing-bucket with a sealing cover, in the chassis there is equipped with motor and the electronic control device that drive the washing-basket to rotate, it has features: this machine has following both A and B two technical features at the same time, or has any one of the following two technical features A and B. Feature A is that set the filter device near the port of the washing-basket, for the convenience of description, it can be called basket's port filter, or impurities blocker, or contaminant retention device. Basket's port filter is coated with dense filter screen, the aperture of the meshes as small as possible under the premise of water flowing through, preferably in the range between 0.1 mm to 1 mm. The subordinate concept of the stated "Settings" includes fixing the hinge, snap-fixing, fixing screwing, bolts, friction fixed, fixation pin plug, etc. The stated "near the port of the basket" means the range of in the washing-bucket and the height below the height of the washing-bucket's cover and above the end of the washing-basket, including the location of the port of the washing-basket or the inner wall of the washing-bucket or the inner surface of the cover. The effect is to make the water flow back into the washing-basket and continue loop and run, and stop the impurities flowing down to the washing-basket and continue looping and running, left the Group C impurities (and part of B impurities with the water rising) retained in the filter screen of the basket's port. The preferred program is that the filter mesh covers the above opening of the washing-basket. Any other equivalent transformation and the inevitable association revelation in this technique violates "infringement by equivalents" in "doctrine of equivalents". Feature B is that open an outfall of draining off water and pollution in the center or quasi-center of the bottom of the bucket, this outfall connected to the outside world by drain pipe, and the outfall may be coupled to the filter mesh when necessary, and the effect is that in the process of rotating to wash the basket and draining off water, the rotational speed of the center of the outfall is much faster than the surrounding, and can make a powerful vortex suction to suck and discharge a larger proportion of deposits of Group B impurities (sand and grit) in the bottom of the bucket, while making the vegetables which are relatively concentrated and stayed near the side wall of the washing-basket attracted to the center of the washing-basket with draining off water, to achieve rolling and flipping the vegetables, and prepare for the next time the basket begins to turn after the basket finishing inlet water and the centrifugal force takes fruits and vegetables to the edge of the basket, to achieve full rolling and flipping once more, and imitate human effects of fruits and vegetables flipping in the water. Every time water is changed, each vegetable is placed to another angle and changed to another face as the face of the water, and this flip is done every time after we change water and is unlike the violence when washing clothes in the washing, any other equivalent transformation and the inevitable association revelation in this technique violates "infringement by equivalents" in doctrine of equivalents". The stated the opening of the draining off water and sewage in the center of the bottom of the washing-bucket is a center opening which can be closed and opened, and the stated washing-basket is a basket that without shaft to be connected to the center of the bottom of the bucket; in the washing-bucket there is a special supporting device to support washing-basket and special positioning device to limit the washing-basket's position and a special transmission mechanism will pass torque to the washing-basket. The term "special" refers to "not occupying the bottom center of the washing-bucket", or "neither occupying the bottom center of the washing-bucket nor occupying the bottom center of the washing basket", and not hindering the arrangement of the drainage outlet at the bottom center of the washing-bucket.

The stated two features of structures can exist in one vegetable washer at the same time, or there are just one exists in one vegetable washer. Of course, only when two features are equipped the vegetables can be cleaned to the most thorough.

The method of washing vegetables that can split and separate impurities in this invention, can also be added with the following technical feature: the bottom of the bucket is funnel-shaped to strengthen impurities' discharge. Rotating blade can be arranged within the funnel-shaped chamber to strengthen the effect of driving water. The rotating shaft of the washing-basket extending downwardly may serve as the rotating shaft of the blade. In addition, the washing-bucket bottom of the bucket is provided a round of annular steps.

The method of washing vegetables that can split and separate impurities in this invention, can also be added with the following technical feature: set filter apparatus below the basket and above the drain pipe, the meshes' aperture of the filter are much sparse, as the standard of preventing the adoption of Group C impurities but passing through Group B impurities, within this standard the meshes' size is changeable, preferably between 2 mm to 5 mm. Filter frame under the basket can be used as a support member of the basket, and can be not the support member of the washing-basket.

The method of washing vegetables that can split and separate impurities in this invention, can also be added with the following technical feature: motor drives the washing-basket to rotate, power of the motor may be transmitted to the basket from any position of the basket, and can be passed to the basket from above or below or next to the basket. When passing from the top to the basket, the method of passing can selectively use the filter's skeleton in the basket's port as a transmission member, or may not choose to use the filter's skeleton in the basket's port as a transmission member. When the rotation axis of the washing-basket or that of the tray of the washing-basket, and power input shaft that connected to the axis are a pair of crossed, which are connected by conventional binding mechanism well known in mechanical field, the subordinate of the stated well known binding mechanism well known includes: worm, universal joint, cross coupling, bevel gear, and so on.

The method of washing vegetables that can split and separate impurities in this invention, can also be added with the following technical feature.

According to the mature techniques in the conventional methods of the commercial vegetable washer, install generating an ozone device or a plasma generating device or ultraviolet generating device, etc., because the installation of these devices are well known mature technology, and is also currently commercially conventional practice of commercial dynamic vegetable washer, so are not written in the claims.

As long as we put these vegetables which are difficult to wash, such as leek, crown daisy *Chrysanthemum*, edible amaranth, watercress, etc., respectively into the vegetable washer of this invention and the vegetable washer of the prior art to wash vegetables, the effect is immediately clear and distinct: vegetables, insect, weed, stale leaves, hair, all are left to the port of the filter of the basket, and no sediment remains in the bottom of the bucket. If comparing the fried food, we will see the outcome after tasting.

Figure 1:
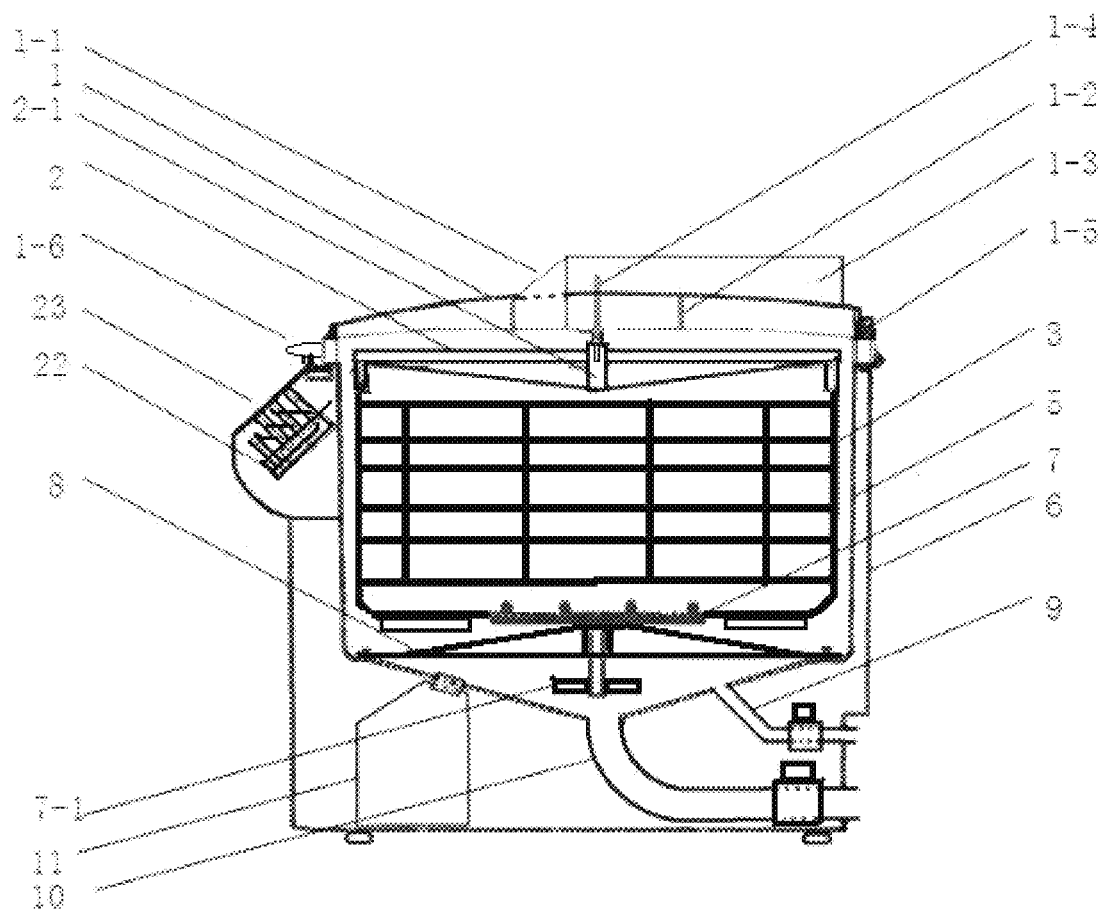
FIG. 1 is the schematic diagram of section view of the first embodiment in this invention.

1, top cover of the washing-bucket; 1-1, filter chamber on the top cover; 1-2, well-shaped ribs and flap; 1-3, gearbox for gear motor assembly; 1-4, gear motor output shaft; 1-5, the hinge axis of the bucket's lid and body; 1-6, spring fastener of the bucket's lid and body;

2, filter of the basket inlet; 2-1, center shaft sleeve of the filter of the basket inlet; 2-2, spline key; 2-3, latch of the filter of the basket inlet; 2-4, ring skeleton; 2-5, spoke; 2-6, filter screen; 2-7, spring; 2-8, spring pawl; 2-9, screw-thread of the filter of the basket inlet; 2-17, the hinge axis of the filter of the basket inlet and the washing-basket; 2-18, lock catch of the filter of the basket inlet;

3, washing-basket; 3-1, water repellent projections; 3-2, socket around the washing-basket;

4, gap of the washing-basket and washing-bucket;

5, washing-buckets;

6, body shell;

7, tray assembly; 7-1, water paddle; 7-2, center shaft; 7-3, neck-head shaped plug;

8, filter under the basket; 8-1, the center tube bearing; 8-3, fixed bolt; 8-4, ring skeleton of the filter under the basket; 8-5, spokes of the filter under the basket; 8-6, strainer of the filter under the basket;

9, water inlet; 9-1, inlet valve assembly;

10, drain; 10-1, drain valve assembly;

11, ozone generator components;

12-1, radial positioning wheel; 12-2, axial positioning bearing wheel;

13, bottom steps;

14-1, pinion; 14-2, toothed belt; 14-3, gearwheel

15-1, small belt pulley; 15-3, big belt pulley 16, worm gear, 17, cardan shafts device; 18, ribs of all kinds of plastic products;

22, controller; 23, operation panel;

101, small pulley on the motor; 102, shaft across upon the bottom of washing-bucket of the vegetable washer in existing technology; 103, big pulley; 104, sleeve set on the shaft 102; 105, round table on projections in the center bottom of the washing-basket; 106, drain around the bottom of the bucket of the vegetable washer in existing technology; 107, water inlet 201, central projection shaft of the washing-bucket of the vegetable washer in existing technology; 202, the shaft set on the center bottom of the washing-bucket of the vegetable washer in existing technology

DETAILED DESCRIPTION OF THE PREFERRED EMBODIMENT

In the embodiment of FIG. 1 to FIG. 8, in the cavity of the body shell 6, the lower part of the cavity is used to set a variety of electrical and equipment of inlet and drainage of water, and the upper cavity is used to set the washing-bucket 5. In the cavity of the washing-bucket 5, the upper cavity is used to receive the washing-basket 3 and the filter 2 of the basket's port, and the lower cavity is provided with tray assembly 7 and the filter 8 under the basket.

The projection of the filter 8 under the basket is round, and the size of the projected area is equal to that of the cross sectional area of the washing-bucket; filter with the skeleton of umbrella-shaped under the basket including: a vertical center tube bearing 8-1, the ring skeleton 8-4 around periphery, the spoke 8-5 is between the bearing and skeleton, and the spokes can have one or multilayer (in order to increase strength, one point in the spoke and one point in the sleeve can be re-welded steel bars with supporting, not shown in this case to be straightforward). The cone surface made by the ring skeleton and spoke 8-5 is covered by the strainer 8-6 of the filter under the basket, of course, the size of the projected area of the filter and the size of the cross-sectional area of the washing-bucket are also quite cavity; Filter 8 is fixed in the bottom of the washing-bucket at the mouth of the funnel under the basket by the fixed bolts 8-3. In this case the filter under the basket is also a support member, telescoped together by the tray assembly 7 to support the washing-basket. The stated tube bearing 8-1 may be instead by the tubular sleeve and the plane bearing fixed in the pipe's opening.

The neck-head shaped plug 7-3 on the tray assembly 7 holes up into the pin holes in the bottom of the washing-basket, and the pin holes are round holes in the middle and strip holes on both sides of the arc, space of the round holes work with the head-neck shaped plug, so that the washing-basket can be easily separated from the tray removed or re-placed in the tray, and transmit the rotation torque through the plug; The central shaft 7-2 of the tray assembly goes through the center tube bearing 8-1 of filter 8 under the basket, put down into the funnel-shaped cavity of the underpart of washing-bucket cavity, and the center shaft 7-2 and the center tube bearing 8-1 cooperate interference. The end of the center shaft 7-2 is fixed with water paddle 7-1. The stated tray is permeable hollow.

The horizontal projection of the filter 2 is circular, and the size of the projected area is equal to that of the washing-basket's inlet; the filter in the inlet has an inverted umbrella-shaped frame, including: a center shaft sleeve 2-1, the ring skeleton 2-4 around periphery, the spoke 2-5 is between the sleeve and skeleton, and the spokes can have one or multilayer (in order to increase strength, one point in the spoke and one point in the sleeve can be re-welded steel bars with supporting, not shown in this case to be straightforward). The cone surface made by the ring skeleton and spoke is covered by the filter screen 2-6, of course, the size of the projected area of the filter and the size of the cross-sectional area of the washing-bucket are also quite; There is latch 2-3 underneath the outer periphery of the ring skeleton. When working, filter 2 in the basket's port covers on the mouth of washing-basket 3, around the basket's mouth are several sockets 3-2, which cooperates with latch 2-3. In this case the filter in the basket's mouth is also a power transmission component, receive torque power from the gear motor output shaft 1-4 through the center shaft sleeve 2-1, and pin inserted to the sockets 3-2 around the mouth of the basket through the latch 2-3 to pass the torque force to the basket.

A proper gap 4 is arranged between the inner wall of the washing basket 3 and the washing-bucket 5, the top cover 1 of the washing-bucket 5 is hinged with the body through the hinge axis 1-5, to achieve the lid's opening and closing through the rotation of the hinge axis, to achieve that the bucket closes the cover by spring fastener 1-6, around the lid sets a waterproof sealing tape. Above the lid sets a gearbox for gearbox for gear motor assembly 1-3 to hold the gear motor, output shaft 1-4 of the gear motor goes through the cover of the underside of the lid and the head inserts into the center shaft sleeve 2-1 of basket's opening, shaft and sleeve are connected with spline key 2-2. Gear motor output shaft 1-4 drive the center shaft sleeve 2-1 to rotate so as to drive the filter at the mouth of the basket.

In the cavity of the body shell 6, the underpart cavity is set with water inlet 9 and the inlet valve assembly 9-1, and the inlet communicates with the washing-bucket, so that water can automatically draw into the washing-bucket 5 under the control of the controller. There is water level controller to monitor water level in the cavity (for simplicity, not shown in the picture).

In the cavity of the body shell 6, the underpart cavity is set with drain 10 and the drain valve assembly 10-1, and the drain is connected with central bottom of the washing-bucket, or quasi-center. In this case the lower part of the washing-bucket is funnel-shaped, and the center is the lowest, so it can form effects of-powerful vortex sewage.

The upper part of the front of fuselage has an operation panel 23, in which there is corresponding controller 22. By operating the control panel buttons, to achieve the operation of the controller. The controller can automatically control water inlet and drainage and the cleaning procedures.

Figure 2:
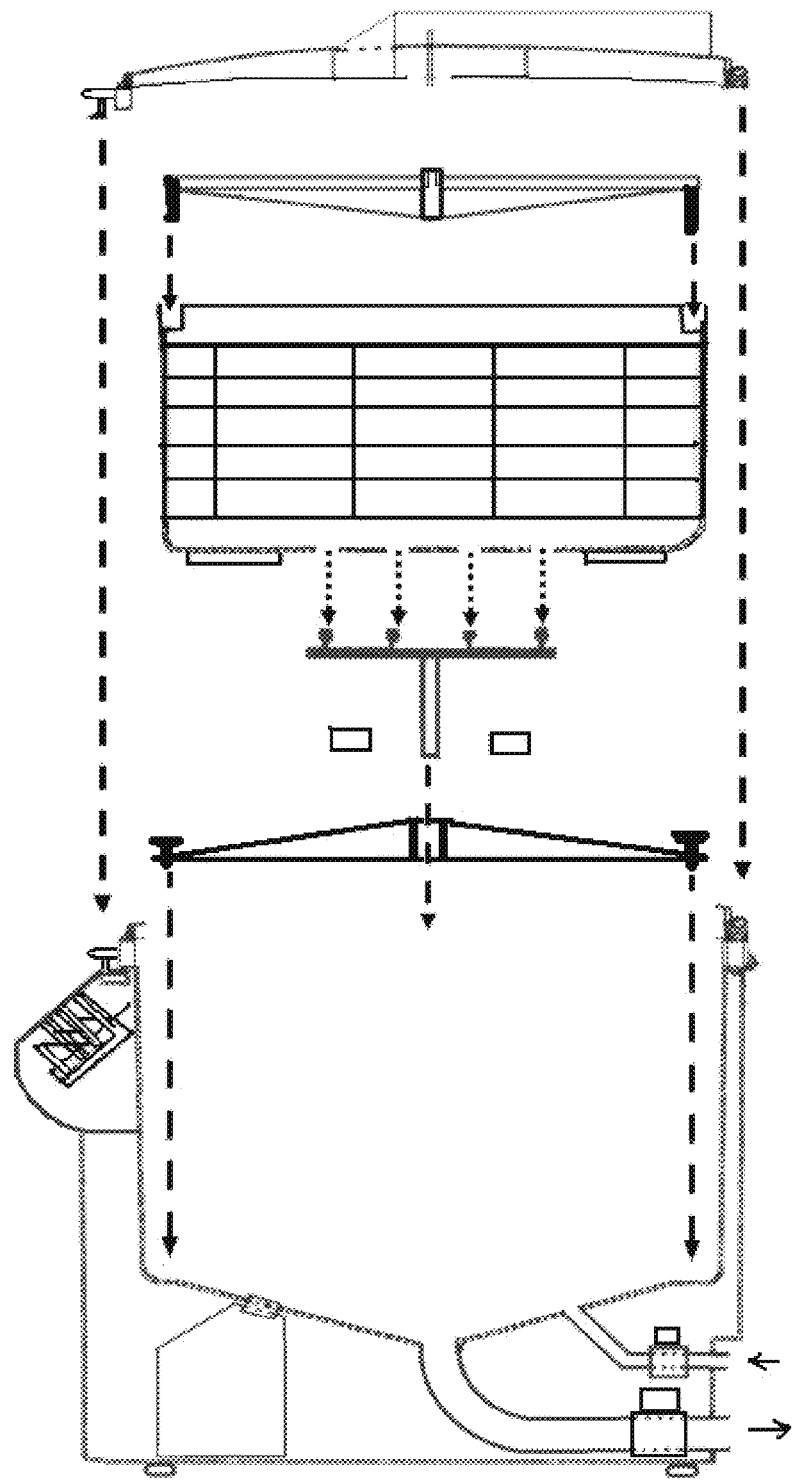
FIG. 2 is the assembling schematic diagram of the first embodiment in this invention.
Figure 3:
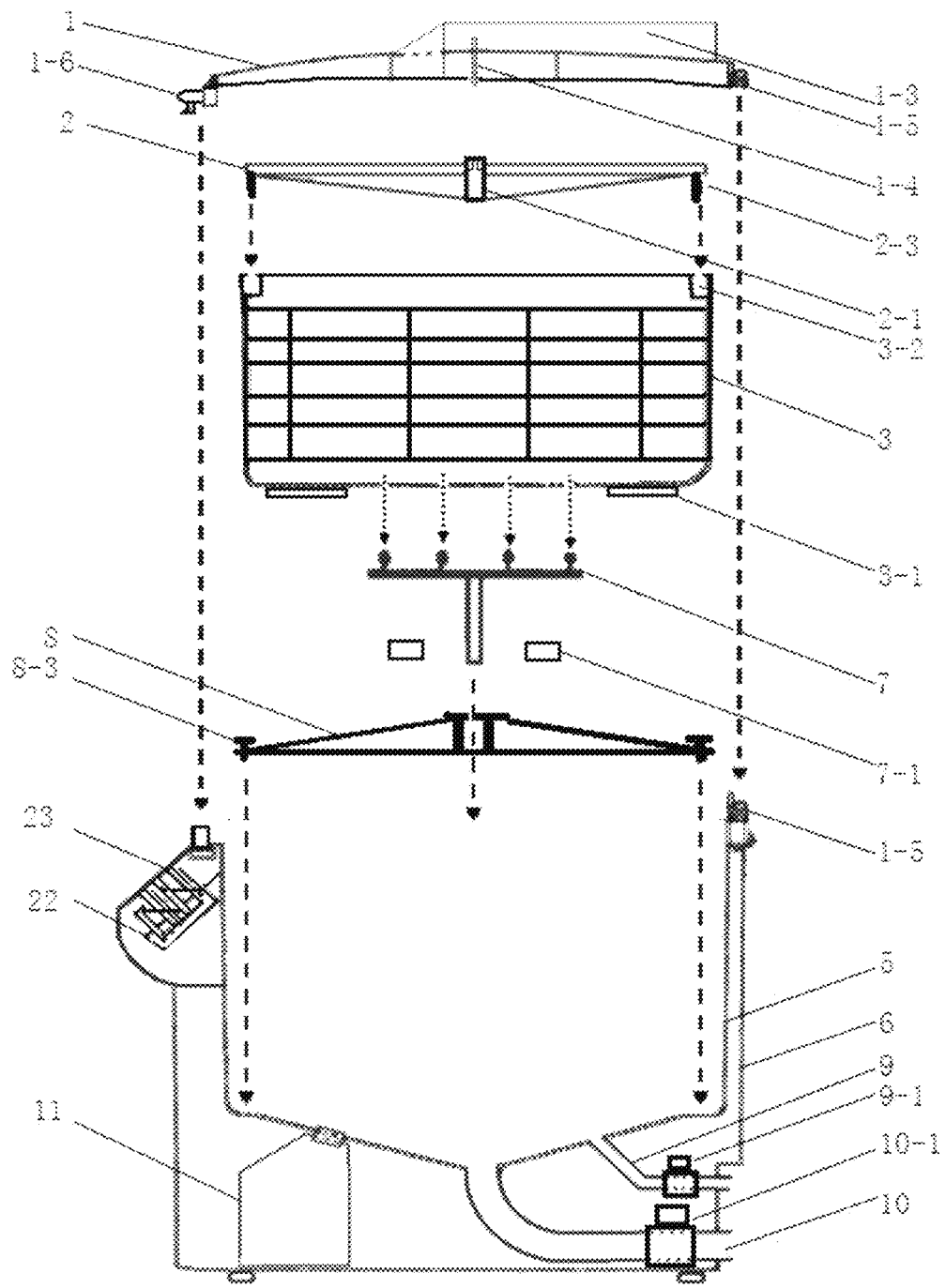
FIG. 3 is the labeling diagram of all parts in the assembling schematic diagram of the washing-bucket and chassis of the first embodiment in this invention.

See FIG. 2 and FIG. 3, in order to be more conducive for understanding the embodiment, FIG. 2 provides the assembly diagrammatic drawing of the first embodiment of the present invention, FIG. 3 is the label of all parts in FIG. 2 (for simplicity, parts of this specification schematic sectional drawing show not symbols).

Figure 4:
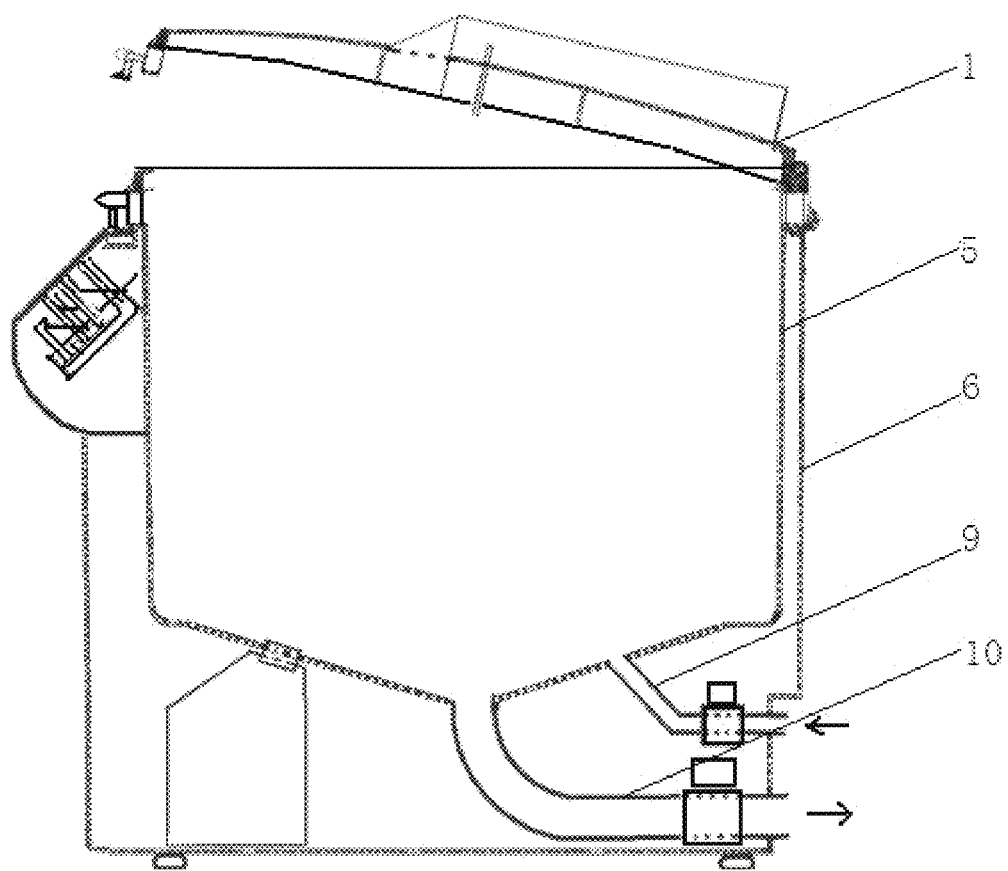
FIG. 4 is the schematic diagram of the washing-bucket and chassis of the first embodiment in this invention.

FIG. 4 is the schematic of the washing-bucket and chassis of the first embodiment of the present invention, that is the schematic that the filter in the basket's opening and the washing-basket and filter under the basket and tray assembly have not been installed, and the snap hook 1-6 of the lid and the bucket body does not catch live, so the lid bounce a certain angle due to the action of the spring hinge axis 1-5.

Figure 5:
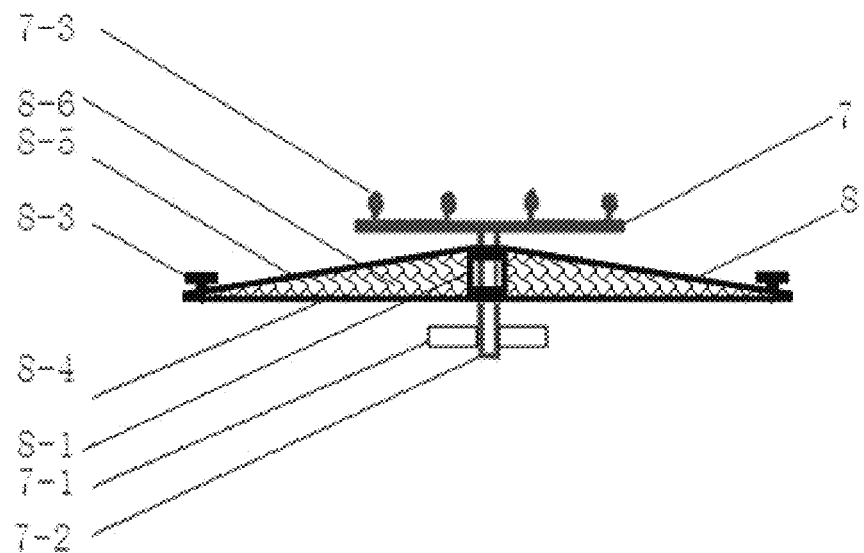
FIG. 5 is the schematic diagram of the filter under the basket and multifunctional trays combination of the first embodiment in this invention.
Figure 6:
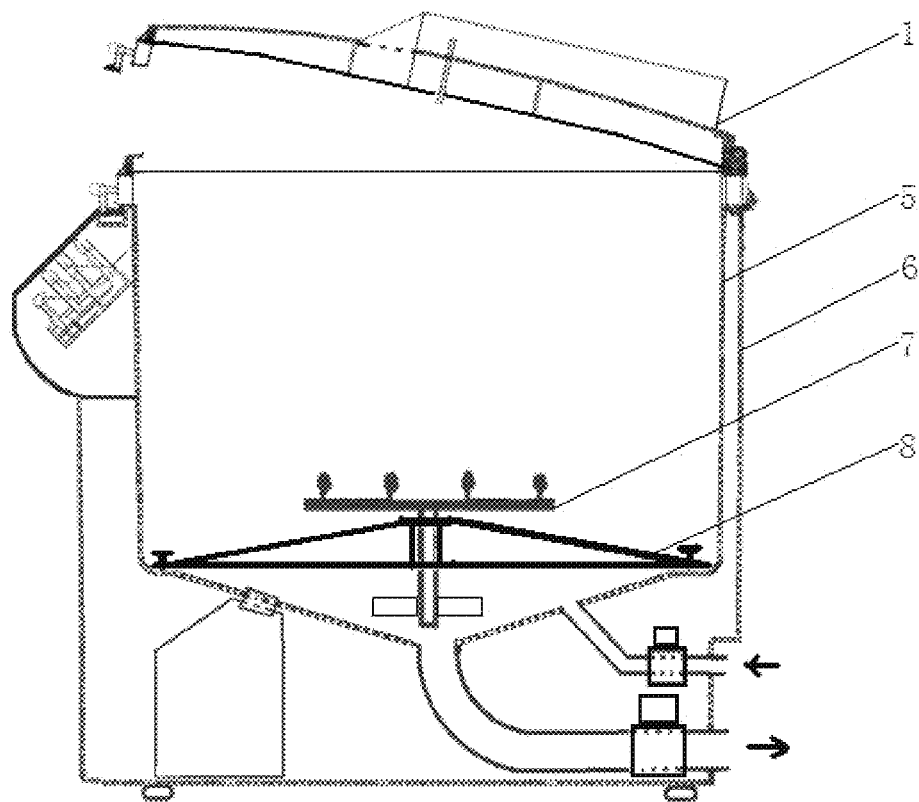
FIG. 6 is the schematic diagram after the filter under the basket and multifunctional trays combination installing on the washing-bucket of the first embodiment in this invention.

See FIG. 5 and FIG. 6, in order to be more conducive for understanding the embodiment. FIG. 5 provides the schematic drawing of the combinations of the filter under the basket and the multifunctional tray of the first embodiment of the present invention. FIG. 6 is a schematic drawing that FIG. 5 is installed in FIG. 4 (for simplicity, the filter mesh under the basket are not shown).

Figure 7:
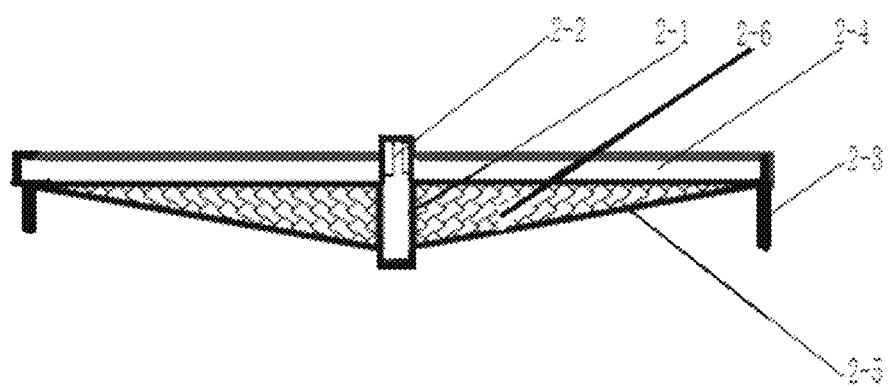
FIG. 7 is the schematic cross-sectional diagram of the filter in the basket's port of the first embodiment in this invention.
Figure 8:
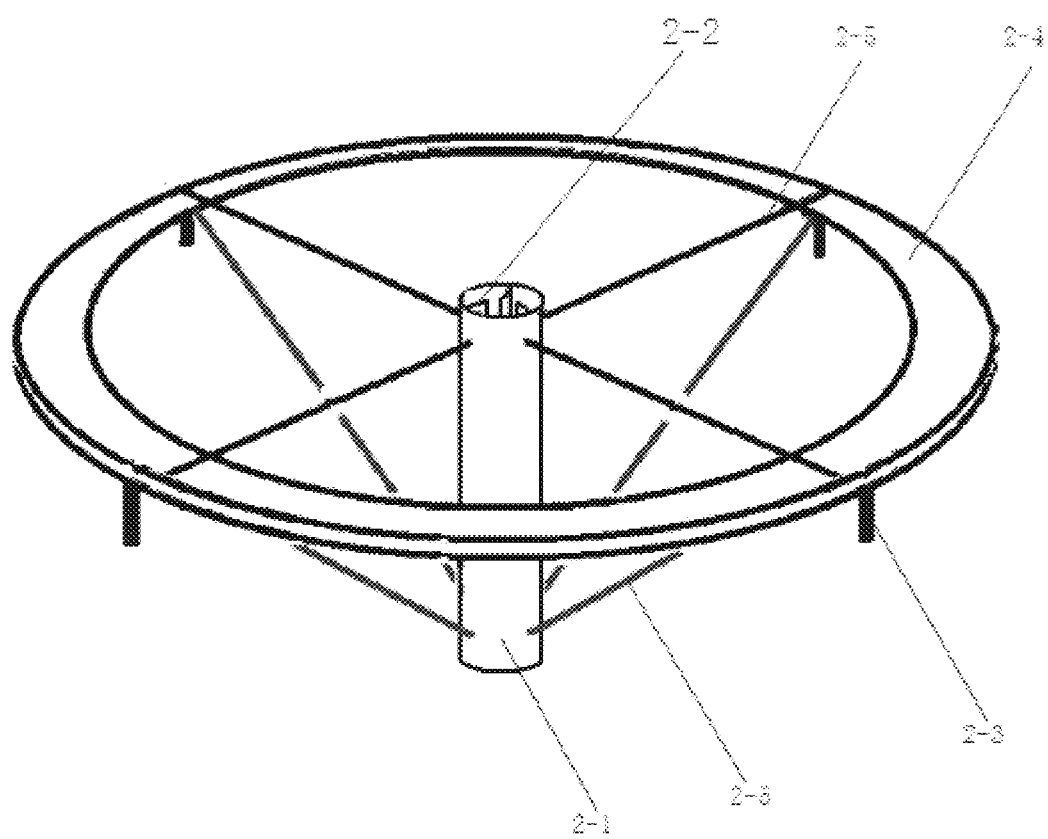
FIG. 8 is the schematic diagram of section view of the filter in the basket's port of the first embodiment in this invention.

See FIG. 7 and FIG. 8, FIG. 7 is a cross-sectional schematic view of the filter in the basket's inlet of the first embodiment of the present invention, and in the drawing the aperture of the filter screen is not painted in proportion, but as a hint, and the filter screen of the basket's inlet in the other figures of the first embodiment are not shown in addition to FIG. 7, FIG. 8 is a stereoscopic schematic view of the filter in the basket's inlet of the first embodiment of the present invention.

When working, put fruits and vegetables into the basket, and put latch 2-3 of the filter of the basket inlet insert into the socket 3-2 of washing-basket inlet to make filter 2 of basket inlet cover the basket inlet. Then cover with the lid, at the same time, slow down the gear motor output shaft 1-4 can be easily inserted the center shaft sleeve 2-1. Then open the inlet valve, under the control of the water level controller draw water to a predetermined level and close the backward valve. Then the motor starts, at the same time the output shaft 1-4 of the gear motor rotates drive the center shaft sleeve 2-1 to rotate through the spline key 2-2 so as to drive the filter of the basket inlet 2 to rotate. Because latch 2-3 of the filter of the basket inlet insert down to the socket 3-2 of washing-basket inlet to drive the whole washing-basket to rotate. And because the neck-head shaped plug 7-3 on the tray assembly 7 holes up into the pin hole associated with it in the bottom of the washing-basket so that the washing-basket drive the tray to rotate. Because the tray has the downward extending center shaft 7-2, the shaft can be synchronized with the rotation of the housing in the circumferential direction, so that the two pieces of water repellent sheet that are fixed to the shaft's end rotate synchronous and repel the water; and because the center shaft 7-2 and the central tube bearing 8-1 of the filter under the basket are interference fit, the shaft is fixed with the bearing 8-1 in the axial direction, while the filter under the basket is fixed by the fixed bolt 8-3 to the bucket body, therefore in the axial direction, the tray is fixed to the bucket body, and also play a supporting role to the washing-basket.

With the rapid rotation of the washing-basket, fruits and vegetables in the basket as well as the water do the centrifugal movement, and fruits and vegetables move to the basket's side and was blocked by the basket's walls and stay near the side wall, while the water flow is flung by the centrifugal forces from the washing-basket to the gap 4 between basket and bucket, then rise to the top of the basket, then water is drawn out with Group B impurities and Group C impurities, and part of Group B impurities sink to the end of the bucket, and the rest Group B impurities and Group C impurities that are thrown together with the rising water flow, rises to the above of the basket, and are hampered by the top lid or the erected retaining ring above the bucket and down to the center of the filter mesh in the basket's mouth, and these impurities cannot pass through the dense mesh and retained in the filter mesh in the basket's mouth, to complete Y operation. While the water flow passes through the filter strainer of the basket ports and continue to fall into the basket, and then, be flung to the gap of washing-basket and washing-bucket by the centrifugal force again, like this cycling flow, each cycle of every stream of water goes through the gap of the vegetables in washing-basket, to form rapidly relative motion with the surface of the fruit and vegetable, and form friction, with the surface of fruits and vegetables, produce friction to impurities and vegetable spin off to complete the X operation. The most crucial point is that each cycle of every water flow takes Group B impurities and Group C impurities mixed up with vegetables out of the washing-basket, and into the filter of basket's mouth. Then, these Group B impurities and Group C impurities stay in the filter of basket's mouth. That is to say, these impurities leave the basket and cannot comeback into the basket, never return, they will be no return to the vegetables if leave the vegetables. In this example set the vegetable washer's basket 200 revolutions per minute, a program of rotating with 20 minutes, about 4000 rpm, even if every turn brings a little bit of impurities (Note: no return impurities, there will not fall back into the basket if impurities come up), a little bit in 4000, it is not possible without cleaning up the impurities. Impurities in washing-basket is reducing every second, this second are less than last second, the next second are less than this second, and all gradually lien to the filter of the basket's mouth. The water flow not only plays the role of water erosion, but also plays the role of scouring, while by the vegetable washer of existing technology, water only plays the role of scouring.

While in the vegetable washer of existing technology, because there is no filter at the mouth of the washing-basket, impurities are thrown from the basket's side, up to the basket's opening, and spray down to the basket from the basket's opening, no matter how many times water cycle up and down and inside and outside, these Group C impurities and part of Group B impurities also cycle so many times along with the water cycling. Water in washing-bucket is discharged, Group C impurities and part of Group B impurities are still mixed in the vegetables, especially worse to the situation of leafy. Therefore, in video advertising of vegetable washer in the existing technology, we have never met that people take these vegetables such as leek garden *Chrysanthemum* amaranth watercress with much more impurities for examples to wash, and often see them take apples peach lettuce and other ingredients that are easy to clean.

The filter of the basket inlet has the function of blocking impurities to backflow and storing up impurities, so it is also known as impurities blocker, or contaminant retention device.

In this embodiment, the operation panel 23 is slated to have many times plans and speed options available to suit the needs of different user's preferences and different fruits' and vegetables' needs. The whole wash process in the present disclosure may cost a total of 24 minutes, including four cycles. Each cycle comprise 6 minutes, including one minute for water inflow takes and four minutes for rotating and washing, and one minute for water outlet. During the four minutes rotating and washing, clockwise rotation and counterclockwise rotation may be applied alternatively.

Now discuss the work feature at the sixth minute of the whole 24-minute process in the present disclosure. Namely, the sixth-minute work is removing the sewage water and impurities. The controller opens the drain valve according to the set procedures, then washing-basket continues to rotate in a clockwise direction, the flow continues to rotate in a clockwise direction, and the water forms vortex in the center of the bucket spinning flowing out of the washing-basket and is discharged out of the washing-bucket by the drain. Since the drain's opening in the bottom center of the washing-bucket 5, then the rotational speed of the water near the mouth of the drain is quite quick, and quickly roll Group B impurities which are deposited in the funnel-shaped bottom of the bucket into the drain, and water continue to rotate after going into the drain due to inertia will, rotating and going forward, which acts like a bullet having a rifle movement inside the barrel, can remove Group C impurities more thoroughly to the outside world, and eliminate sand accumulated nearby rubber plug in the drain valve to avoid leakage.

Also, before the drain valve open, there are parts of heavy Group B impurities, when rotating to the drain's opening at the center bottom of the bucket, having dropped to the drain to wait for the discharge, that is to say, the drain provides indwelling space for Group B impurities and becomes indwelling devices of Group B impurities. In this way, when the washing-basket is rotating and working, Group B impurities in washing-basket is reducing every second, this second are less than last second, the next second are less than this second. While the vegetable washer in existing technology, because there is no opening in the bottom center of the bucket, most of Group B impurities (except parts with water rising and cycling) accumulate center around axis 102 in the bottom.

Figure 22:
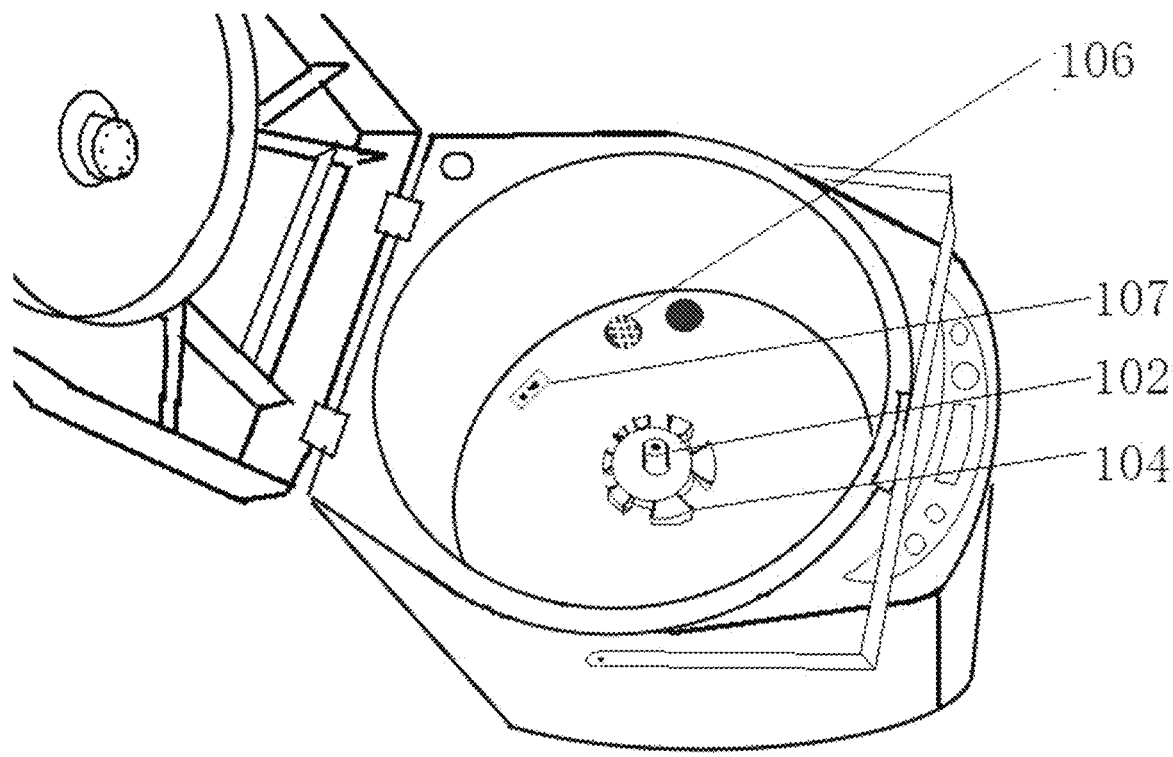
FIG. 22 is the physical picture of the structure of the bottom of the basket of the vegetable washer with the power below in existing technology.
Figure 23:
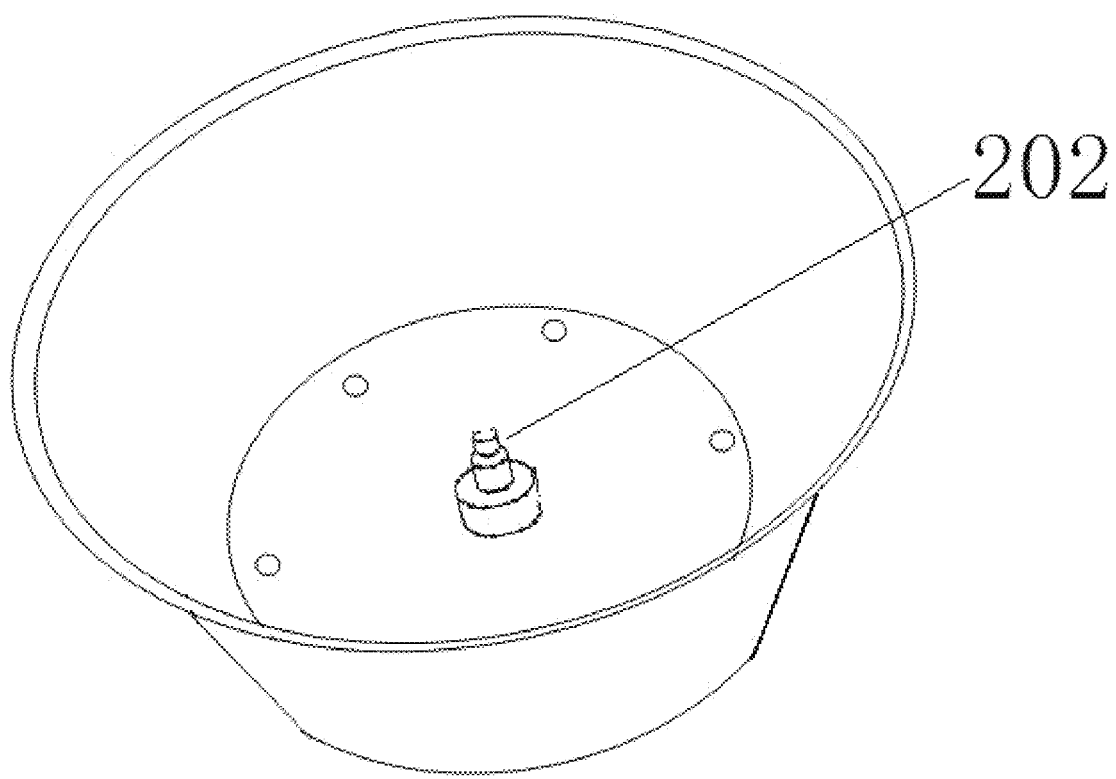
FIG. 23 is the physical picture of the structure of the bottom of the basket of the vegetable washer with the power supra in existing technology.

The vegetable washer of existing technology, since in the central bottom of the bucket sets the rotation axis, the drain's opening can only be set at the edge of the bottom of the washing-bucket, and it fails to achieve this effect, see FIG. 22 and FIG. 23. There exist four defects in this bucket-bottom structure of the existing technology: First, because of the water's rotation large number of Group B impurities accumulate in the central area of the bucket's bottom (near the axis of FIG. 22 or near the shaft seat of FIG. 23), these impurities cannot be discharged from the drain provided in the drain edge of the bucket's bottom. Second, the sand particles long-term accumulating in the vicinity of the axis are likely to be involved in the gap of shaft and waterproof cup, causes cup scratches and scratches causes sealing leakage. Third, the hydrodynamic characteristics of the sewage flowing to the center outlet while rotating cannot be used to take away the impurities, particularly Group B impurities. Fourth, water flow cannot be discharged by rifled type moving after going into the drain pipe, to the accumulation of sand flowing through the drain valve when in the vicinity of the rubber plug in the drain valve, which easily lead to a rubber stopper loose relationship, leading to water leakage.

As we all know, the cross-section of the washing-bucket's chamber of the vegetable washer and that of the washing-basket are a pair of concentric circles, so the shaft of the washing-basket of course goes through the center of this pair of concentric circles. Therefore in the central bottom of the vegetable washer of existing technology there sets the rotating shaft go through upward (see FIG. 22) or set shaft seat at the center bottom of the bucket (see FIG. 23) is also a matter of course, nothing wrong; this setting is an inevitable association of a staff in this technology. And the innovative thinking and creative work of the present invention lies in the irrational setup program that abandons the conventional. Open the outlet in the bottom center of the bucket filled with water, and the sewage effect has been improved essentially. Coupled with the bottom of the bucket made as funnel-shaped, sewage is very thorough.

Now discuss the work feature at sixth minute to eighth minute of the whole 24-minute process. Namely, the fruits and vegetables make periodic centripetal movement and centrifugal movement, in order to achieve the placement angle of flipping and flapping fruits and vegetables in the basket. At the sixth minute, the controller opens the drain valve according to the set procedures, then washing-basket continues to rotate in a clockwise direction, and the water flow continues to rotate in a clockwise direction, due to the opening of drain 10 opens in the center bottom of the washing-bucket 5, the water rotates to the center from all around, and form vortex in the center of the bucket spinning out of the washing-bucket and discharge outside by the drain. The water flow also drives fruits and vegetables to move towards the center of the basket (including scrolling and flipping). Until the water is drained, close the drain valve. Fruits and vegetables changes from the "relatively concentrating remain near side walls in the washing-basket" to "relatively concentrating remain near the center in the washing-basket." At the seventh minute, according to set procedures the inlet valve opens the second time, penetrating water under the control of the water level controller to a predetermined level and then backward valve is closed. Next at the eighth minute, motor starts, then output shaft 1-4 of gear motor rotates and goes through spline key 2-2 of a large loose gap driving the center shaft sleeve 2-1 to rotate so as to drive the filter 2 of the basket's inlet to rotate. Because latch 2-3 of the filter of the basket inlet insert down to the socket 3-2 of washing-basket inlet to drive the whole washing-basket to rotate. Thereby drive water paddle 7-1 rotates together to repel, thereby drive the whole bucket of water in the washing-bucket to rotate together. With the rapid rotation of the washing-basket, fruits and vegetables in the basket as well as the water do the centrifugal movement, and fruits and vegetables move to the basket's side and was blocked by the basket's walls and stay near the side wall, and back to the position before the original drainage. The same of the process of centrifugal movement and the process of the concentric movement is the process of fruits and vegetables sufficiently rolling and turning, to achieve the effect of replacing manual turning fruits and vegetables in the water. Like this every time water is changed, each vegetable is placed to another angle and changed to another face as the face of the water. And this flip is done every time after we change water, and is unlike the violence when washing clothes in the washing, so it will not cause harm to fruits and vegetables.

The stated output shaft 1-4 and the center shaft sleeve 2-1 use a large loose gap key, for example, only four or three teeth, etc. are for convenience when you put the lid the shaft 1-4 can be easily inserted into the center shaft sleeve 2-1, as long as achieving this purpose and can play a driving role, it can be OK in any other conventional mechanical solutions. For example, gear transmission cross shaft surface can be all right in the field of mechanical.

Whether the stated washing process to be introduced into the ozone or not, there are two options for users to choose on the operation panel 23. If desired, may according to the program automatically inlet ozone into the washing-bucket 5 by the ozone generator components II within a predetermined time. Discharge excess ozone residue through the filter chamber 1-1.

Figure 9:
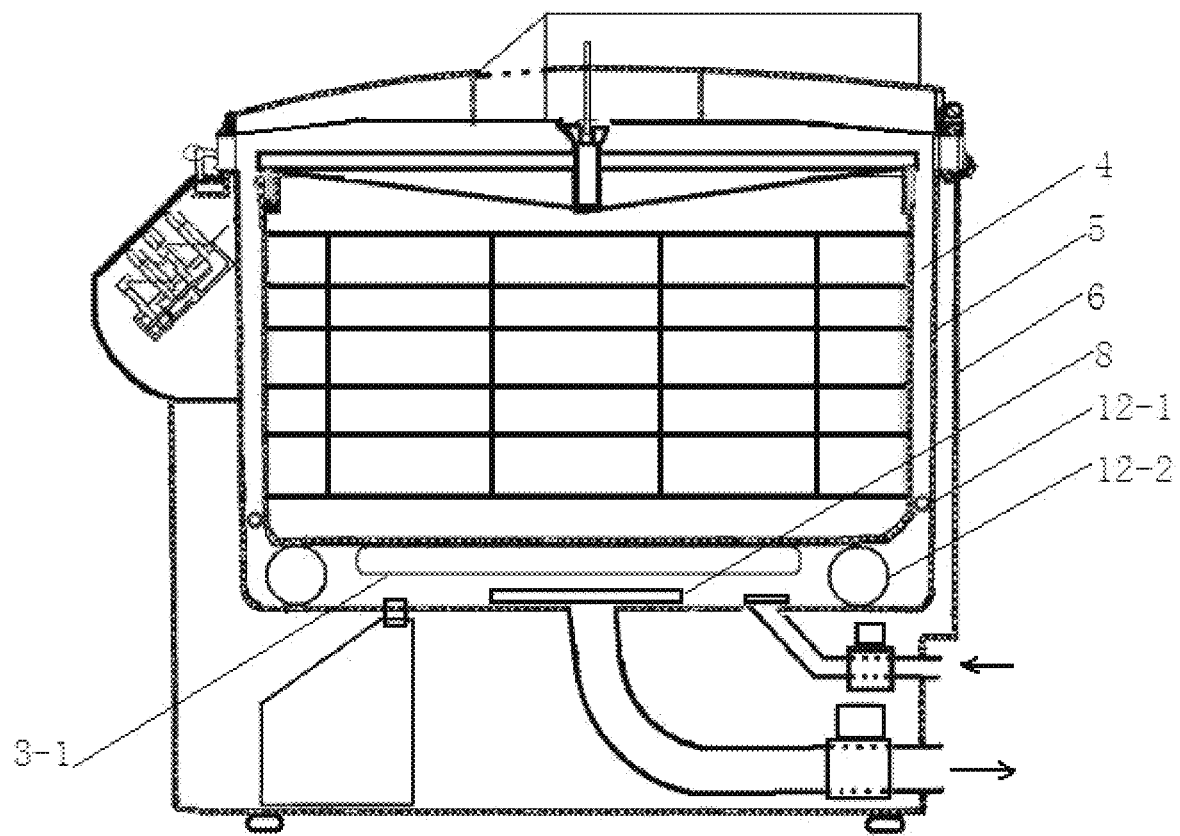
FIG. 9 is the schematic diagram of section view of the second embodiment in this invention.

Referring to FIG. 9, a proper gap 4 is provided between the inner wall of the washing-bucket and washing-basket as water flow's rising channel. Now that it is the channel, the diameter is the same as a water pipe, and the width of the channel can only be determined based on the desired flow rate and flow speed which are affected by the size of the bucket and speed of the washing-basket's rotation. Therefore, it cannot have a uniform value, such as a same number, is not the best choice of two washing-buckets of a small diameter and a big diameter. But by the logic of the relevant amounts described in this paragraph, we can calculate the value for the optimum gap to specific examples step by step through the experimental.

FIG. 9 is the second embodiment of the present invention. The difference between this embodiment and the embodiment 1 is: the filter 8 under the basket is a disc-shaped planar filter, fixed in the center of the bottom of the bucket; the washing-bucket's bottom is flat around the washing-basket is mounted three or more radial positioning wheels 12-1, playing the role of a radial positioning; when the washing-basket rotating, use the rolling friction of the wheel with the inner wall of the washing-bucket to avoid the sliding friction and collision of the basket with the inner wall of the bucket, while allowing the washing-basket's taking and placing, a spherical square wheel is used in the figure; bottom surface of the washing-basket is mounted an axial positioning bearing wheel 12-2, plays the role of supporting the washing-basket, together with the lid and the filter of the basket port define the axial position of the washing-basket, spherical casters are used in the figure; a water repellent projections 3-1 in the end of the basket, the allocation of water can have multiple pieces, forming a cross-shaped cross or X-type or can also be made into rice-shaped swastika-shaped (refer to seeing from bottom angle) and so on.

Figure 10:
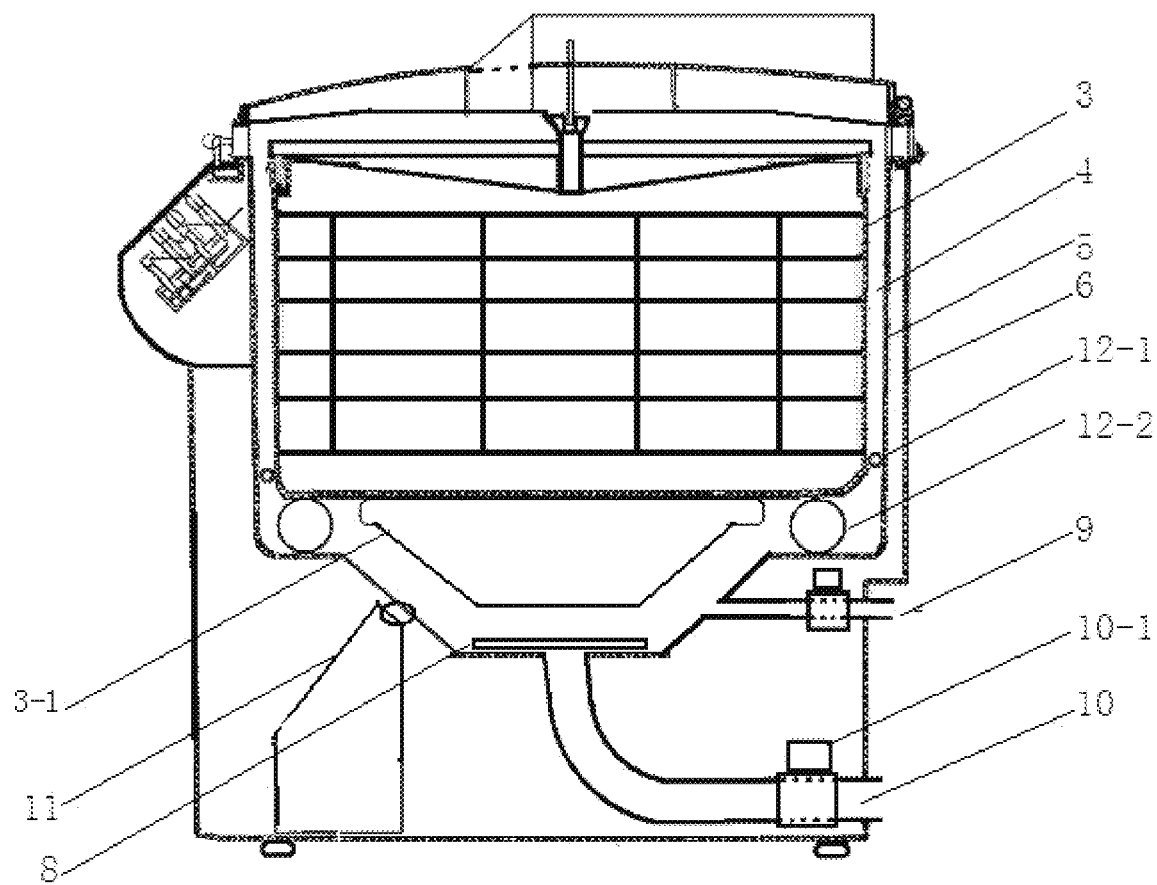
FIG. 10 is the schematic diagram of section view of the third embodiment in this invention.

FIG. 10 is the third embodiment of the present invention. The difference between this embodiment and the embodiment 2 is: the bottom of the bucket is Truncated cone shape.

Figure 11:
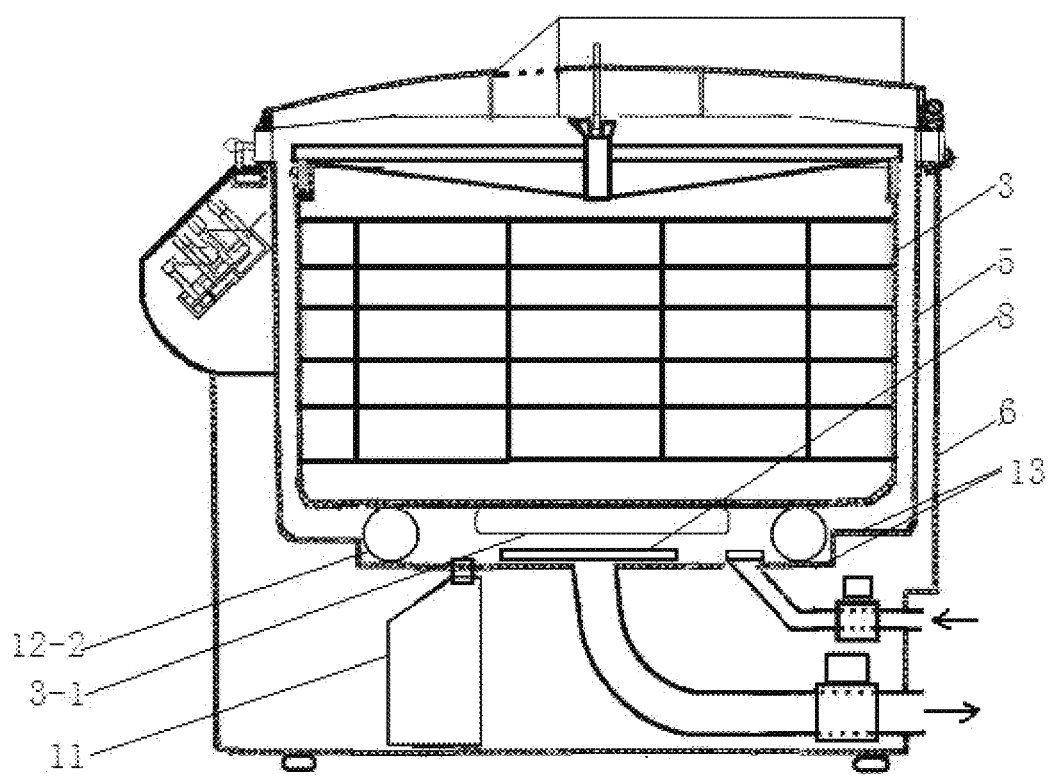
FIG. 11 is the schematic diagram of section view of the fourth embodiment in this invention.

FIG. 11 is the fourth embodiment of the present invention. The difference between this embodiment and the embodiment 2 is: in the bottom of the bucket there is an annular step 13, the axial positioning bearing wheels 12-2 just falls on the face of the step, the vertical face of the step plays the role of positing to the radial position of the basket, which eliminates positioning wheel around basket; filter 8 under the basket is a flat disc filter fixed to the drain port.

Figure 12:
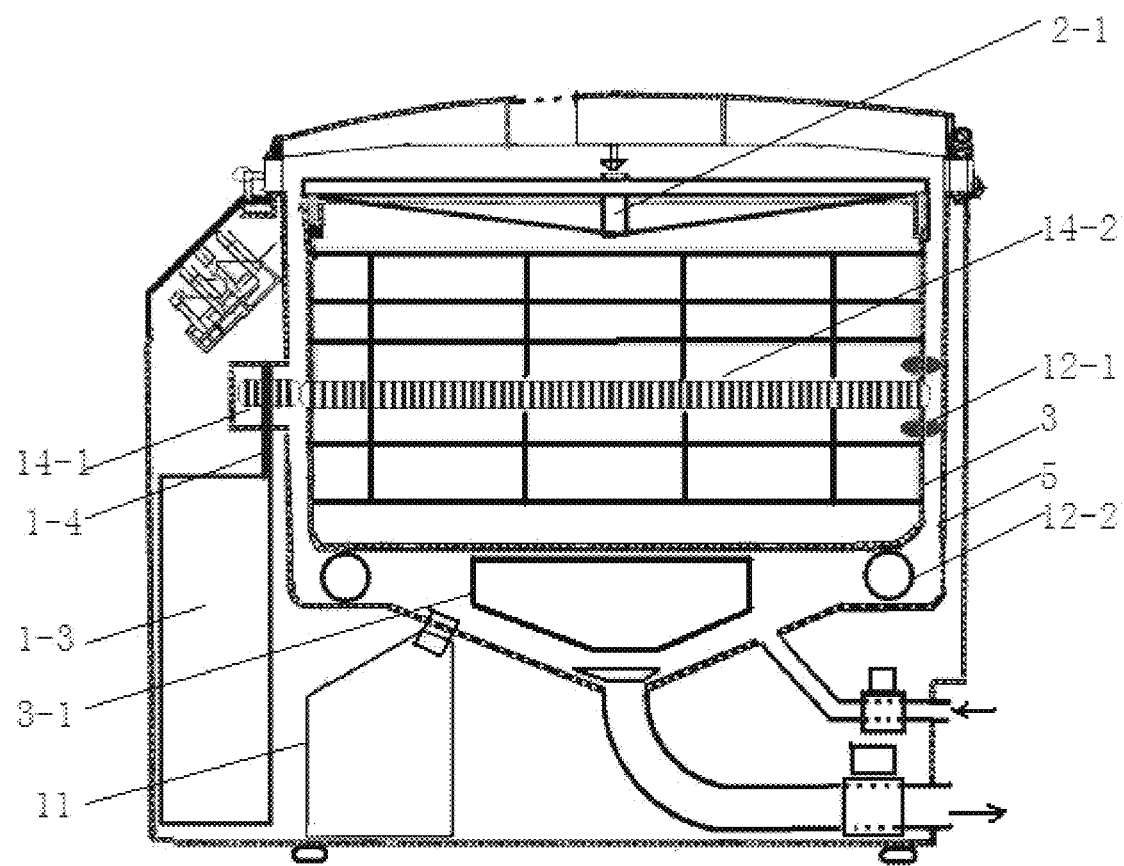
FIG. 12 is the schematic diagram of section view of the fifth embodiment in this invention.

FIG. 12 is the fifth embodiment of the present invention. The difference between this embodiment and the embodiment 1 is: Power comes from the side of the basket, gearbox for gear motor assembly 1-3 is fixed in the bottom side of the body shell 6, output shaft 1-4 goes up through the grooves on the sides of washing-bucket, and interference connection with pinion 14-1. The groove is called gear compartment of the bucket's side, and the outer periphery of the washing-basket wall has a circle of rack waist, called toothed belt 14-2, the teeth of which engaged with those of pinion 14-1, in order to achieve that motor driving the washing-basket to rotate; around the washing-basket is mounted three or more radial positioning wheels 12-1, playing the role of a radial positioning; when the washing-basket rotating, use the rolling friction of the wheel with the inner wall of the washing-bucket to avoid the sliding friction and collision of the basket with the inner wall of the bucket, while allowing the washing-basket's taking and placing, a spherical square wheel is used in the figure; bottom surface of the washing-basket is mounted an axial positioning bearing wheel 12-2, plays the role of supporting the washing-basket, and together with the lid and the filter of the basket port define the axial position of the washing-basket, spherical casters are used in the figure; a water repellent projections 3-1 in the end of the basket, the allocation of water can have multiple pieces, forming a cross-shaped cross or X-type or can also be made into rice-shaped, swastika-shaped (refer to seeing from bottom angle) and so on. In addition, the center of the lid has downward extending resilient idle lever pressed the center shaft sleeve 2-1 of the basket's inlet filter, serving to prevent the beating of the basket inlet filter without affecting its rotation (for simplicity, in this specification gear plate and pulley plate are not processed for cross-sectional view).

Figure 13:
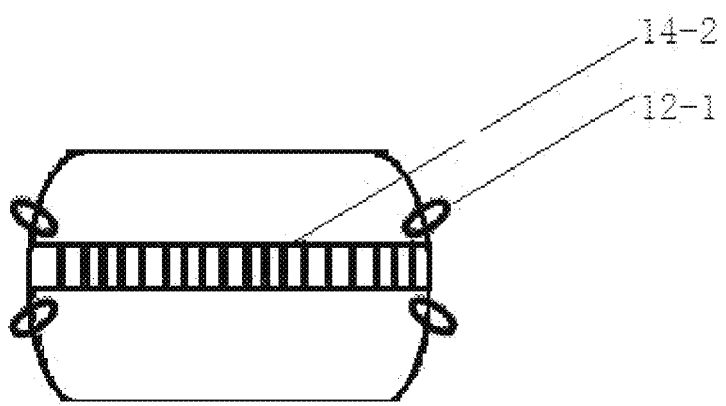
FIG. 13 is the schematic diagram of another equivalent transformation of the washing-basket of the fifth embodiment in this invention.

FIG. 13 is another equivalent transformation of the washing-basket of the fifth embodiment of the present invention. The washing-basket is bulging in waist, and the entire basket was drum, and teeth belt locates in the bulged position.

Figure 14:
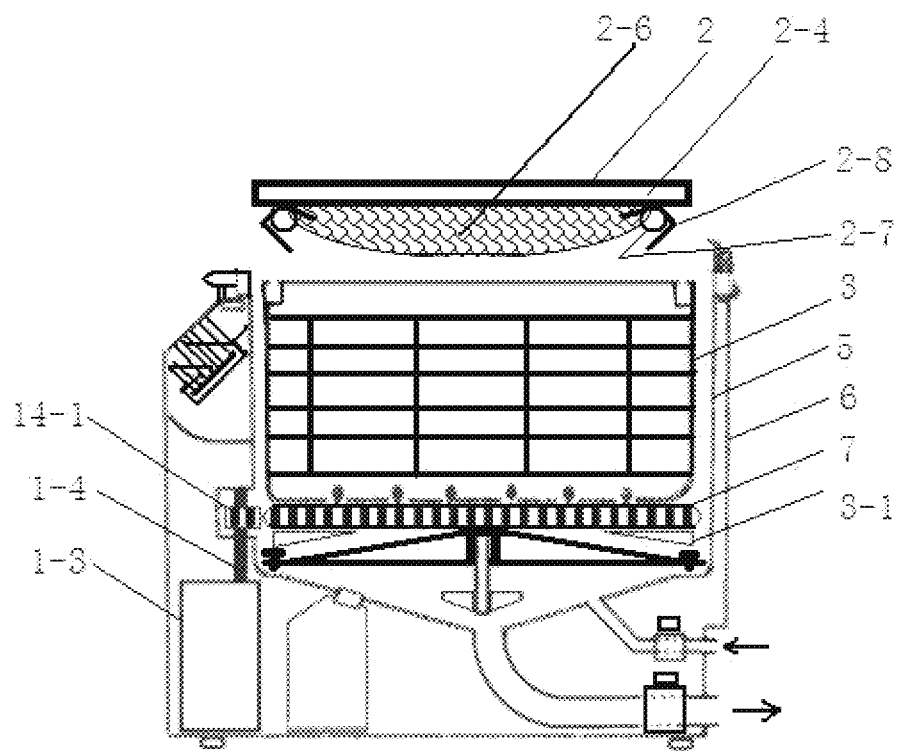
FIG. 14 is the schematic diagram of section view of the sixth embodiment in this invention.

FIG. 14 is the sixth embodiment of the present invention. The difference between this embodiment and the embodiment 1 is: the power is from the under part of the basket, and gearbox for gear motor assembly 1-3 is fixed in the bottom side of the body shell 6, output shaft 1-4 goes up through the grooves on the sides of washing-bucket, and interference connection with pinion 14-1. The groove is called gear compartment of the bucket's side, in FIG. 1 the area of multi-purpose tray assembly 7 in the bottom of the basket is enlarged to the degree in contact with the pinion 14-1 and may be engaged with each other in this embodiment, of course, the entire side surface of the tray are gears which are engaged with pinion 14-1. We can also take the whole plate of the tray as a big gear; under the plate is water repellent projections 3-1, which can be multiple, arranged to a lap of radially. In addition, in this embodiment the filter of basket's port 2 is a circular flat filter, and a number of spring pawl 2-8 are set around the filter, in the action of the spring 2-7, the claws open to the outer circumference, when using them, put the end of claws into the basket mouth, snap the filter in the mouth of the washing-basket a little harder, spring pawls 2-8 are pressed into the basket and clamp the basket wall to achieve fixing them. The figure is the schematic cross-sectional view of four claws structure (for simplicity, the lid of the washing-bucket is not shown).

Figure 15:
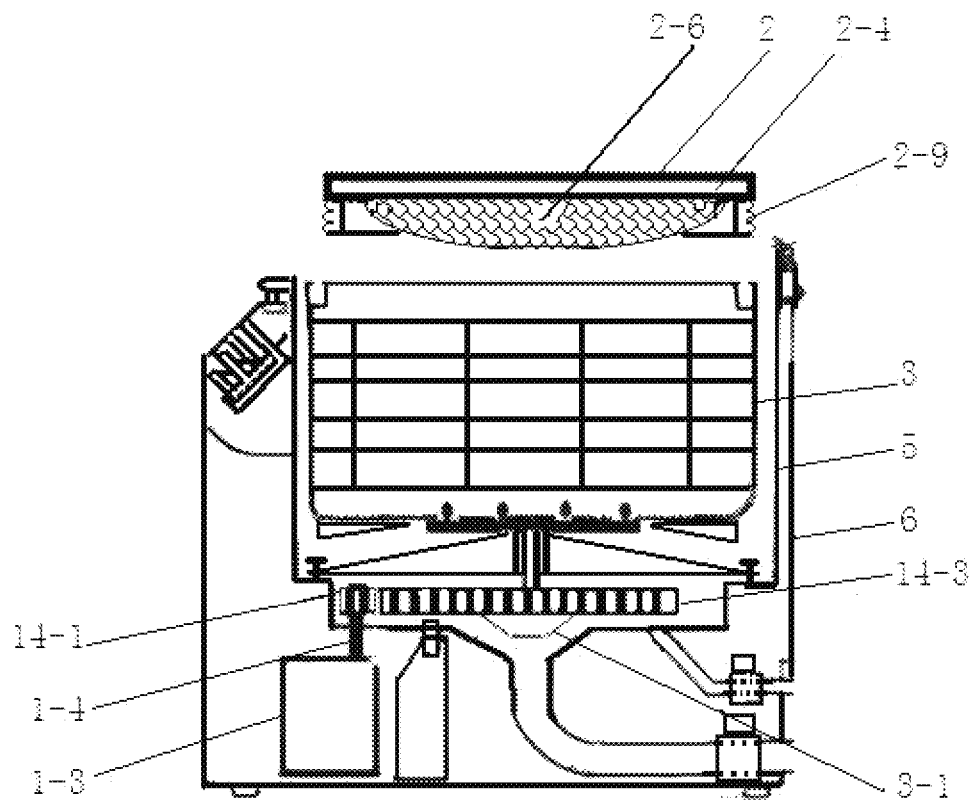
FIG. 15 is the schematic diagram of section view of the seventh embodiment in this invention.

FIG. 15 is the seventh embodiment of the present invention. The difference between this embodiment and the embodiment 1 is: the power is from the under part of the basket, and gearbox for gear motor assembly 1-3 is fixed in the bottom side of the body shell 6, output shaft 1-4 goes up through the grooves on the sides of washing-bucket, and interference connection with pinion 14-1. In the place of installing water paddle 7-1 in FIG. 1, the end of the shaft, instead for installing big gearwheel 14-3 engaged with big pinion 14-1, under the big gear is water repellent projections 3-1 the allocation of water can have multiple pieces, forming a cross-shaped cross or X-type or can also be made into rice-shaped, swastika-shaped (refer to seeing from bottom angle) and so on. The sated large gear is permeable and hollow. In addition, in this embodiment the basket inlet filter 2 is a shallow cylindrical frame, above coats filter to form the frame of shallow cylindrical, and there is a lap of screw-thread 2-9 around the outer circumference of the cylinder which can rotate and secure to the washing-basket. (There are the screw threads working with that screw thread around the inner surface of the basket). (For simplicity, the lid of the washing-bucket is not shown).

Figure 16:
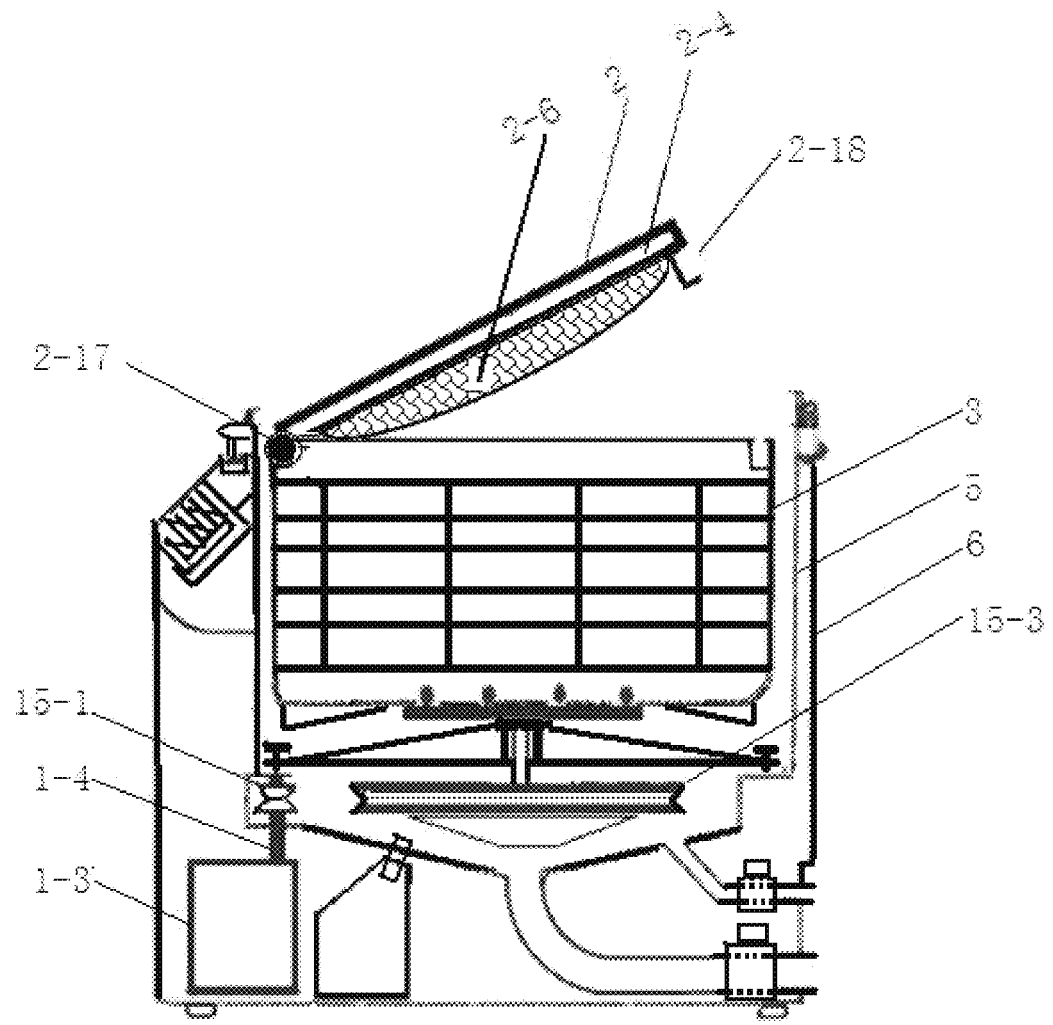
FIG. 16 is the schematic diagram of section view of the eighth embodiment in this invention.

FIG. 16 is the eighth embodiment of the present invention. The difference between this embodiment and the embodiment 7 is: in FIG. 5, pinion 14-1 and big gearwheel 14-3 are changed to be small belt pulley 15-1 and big belt pulley 15-3 in this case. For simplicity, the belt is not drawn in the figure. (For simplicity, the lid of the washing-bucket is not drawn). In addition, in this embodiment the basket inlet filter 2 is concave-shaped member formed from an annular frame 2-4 coated filter screen 2-6. It is hinged to the washing-basket, by rotating hinge axis 2-17 to achieve open and close, and there can be fastened lock catch 2-18 locking the washing-basket.

Figure 17:
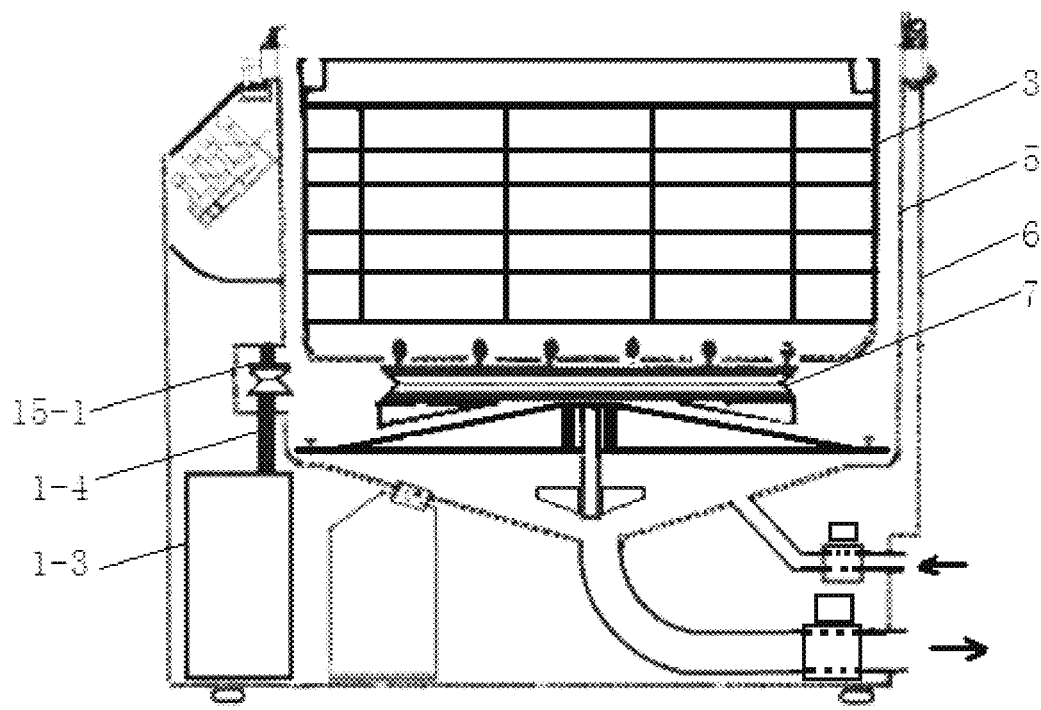
FIG. 17 is the schematic diagram of section view of the ninth embodiment in this invention.

FIG. 17 is the ninth embodiment of the present invention. The difference between this embodiment and the embodiment 6 is: in FIG. 14, pinion 14-1 and gear-type tray assembly 7 are changed to be small belt pulley 15-1 and pulley-type tray 7 in this case. For simplicity, the belt is not drawn out in the figure. (For simplicity, the lid of the washing-bucket is not drawn out).

Figure 18:
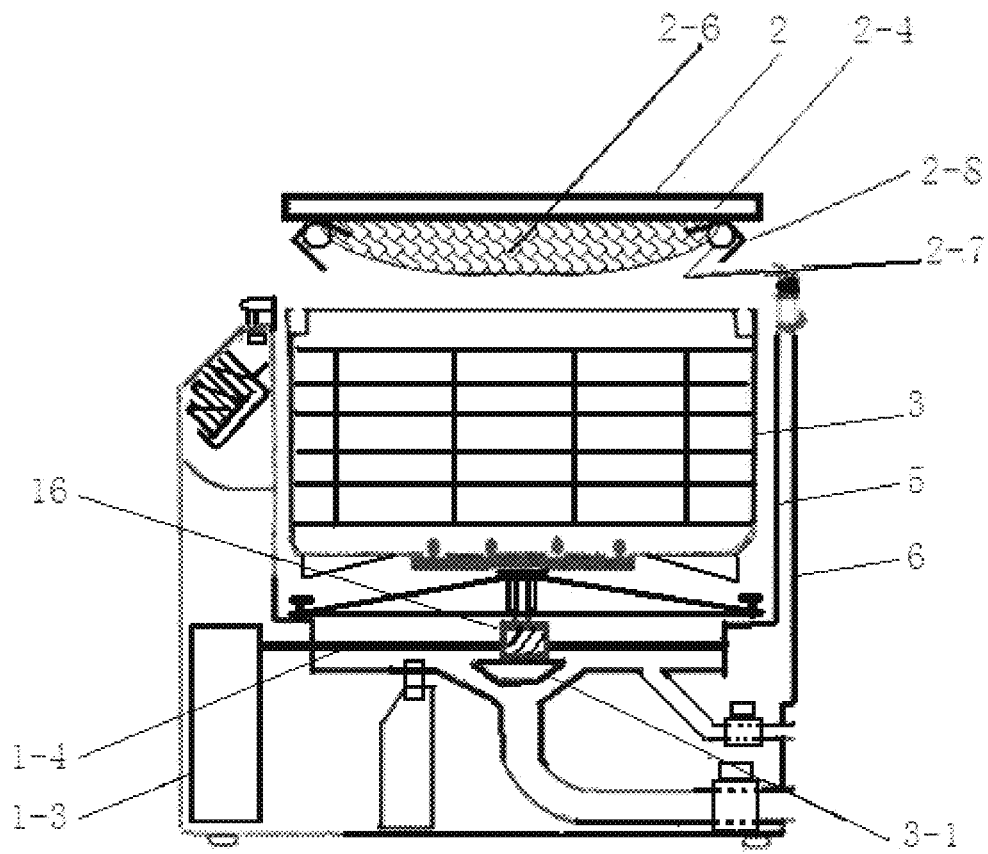
FIG. 18 is the schematic diagram of section view of the tenth embodiment in this invention.

FIG. 18 is the tenth embodiment of the present invention. The difference between this embodiment and the embodiment 7 is: intermediate section of the gear moto output shaft 1-4 (it is the power input shaft as to the basket) has the worm thread, the lower end of the shaft of the washing-basket is fixed to worm gear 16, the stated worm screw and the worm gear work together to achieve transmitting power. Shaft 1-4 can also be multi-axial shafts connected together. (For simplicity, the lid of the washing-bucket is not drawn out).

Figure 19:
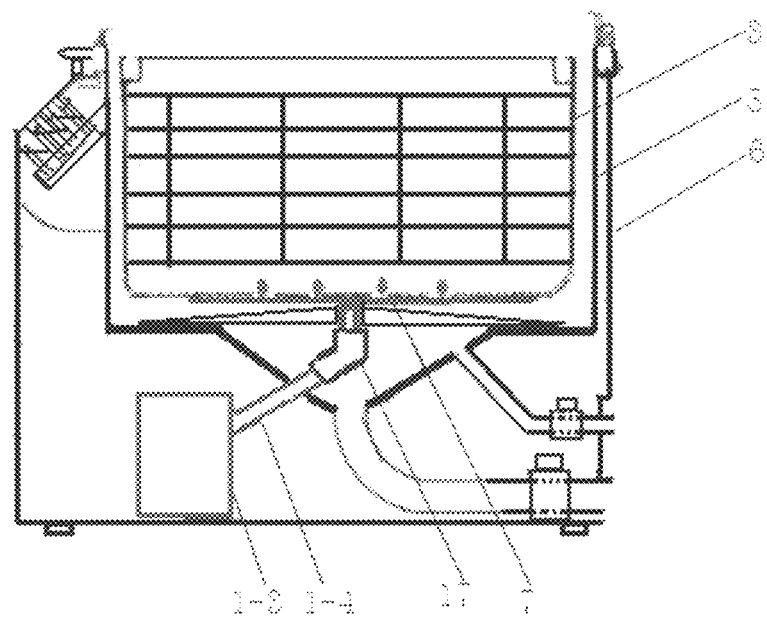
FIG. 19 is the schematic diagram of section view of the eleventh embodiment in this invention.

FIG. 19 is the eleventh embodiment of the present invention. The difference between this embodiment and the embodiment 10 is: transfer power input shaft and shaft of the washing-basket form a pair of crossed shafts, which are connected to the cardan shafts device 17 to achieve transmitting power. (For simplicity, the lid of the washing-bucket is not drawn out).

Figure 20:
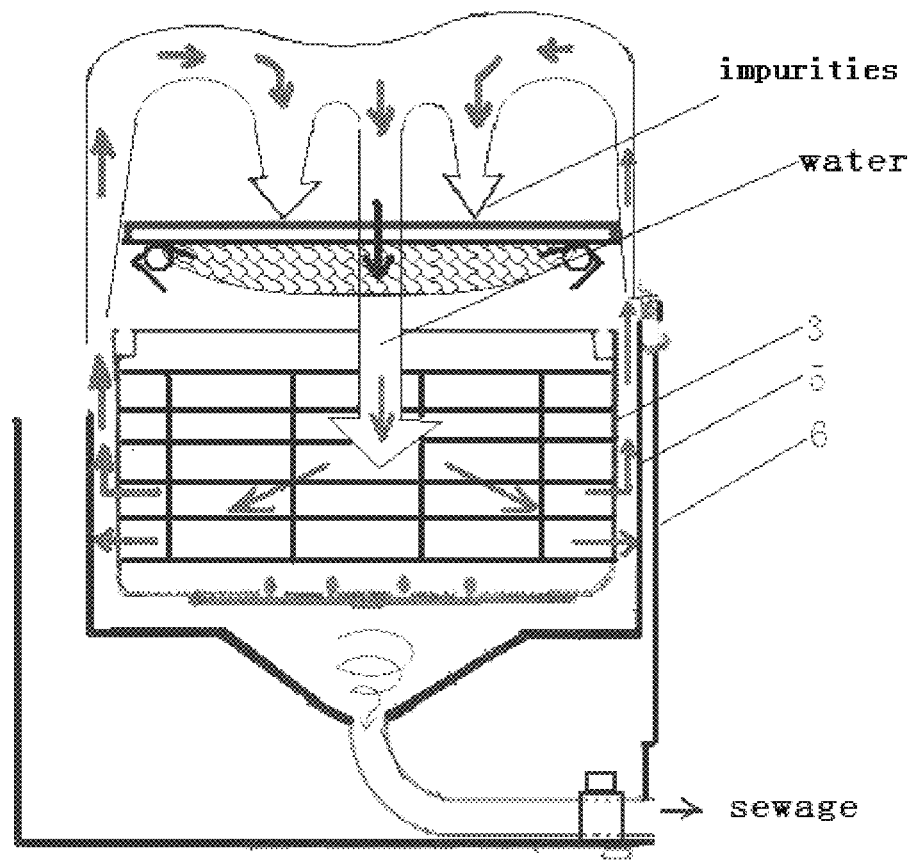
FIG. 20 is the schematic diagram of separating and dividing the Group B impurities and Group C impurities in the vegetable washer in this invention.

FIG. 20 is the schematic diagram of splitting and separating water flow and the Group impurities in the vegetable washer in this invention.

Figure 21:
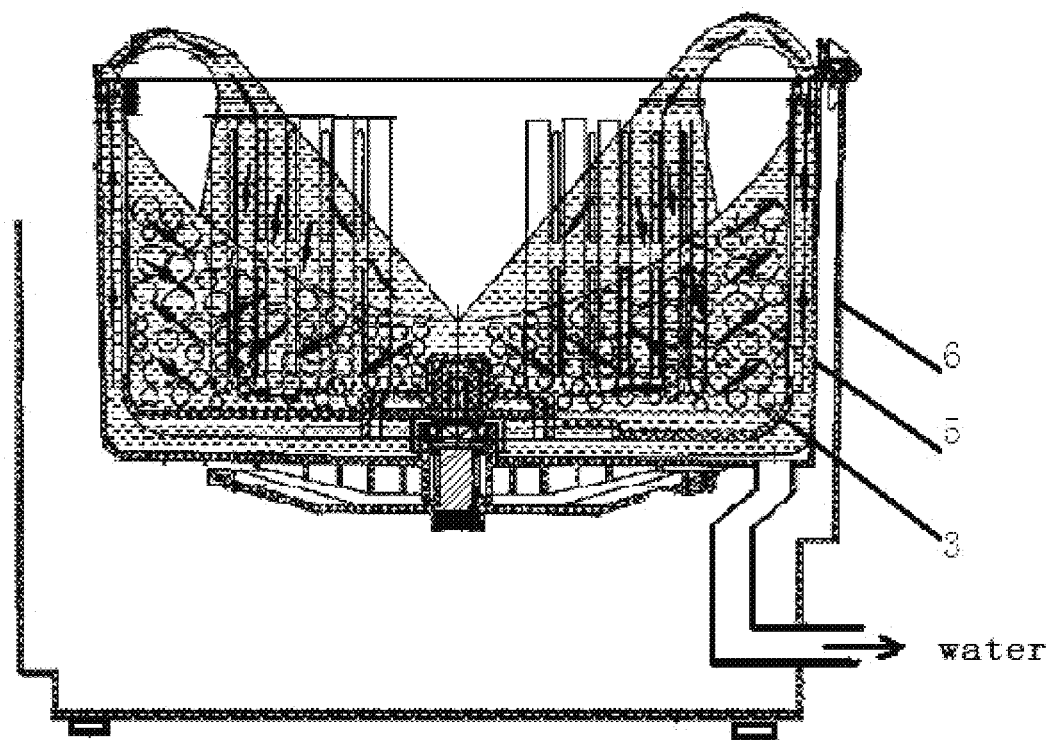
FIG. 21 is the cycling diagram of the mixing of water flow and the Group B impurities all along in the vegetable washer in existing technology.

FIG. 21 is the cycling diagram of the always mixing of water flow and the Group B impurities all along in the vegetable washer in existing technology.

Figure 24:
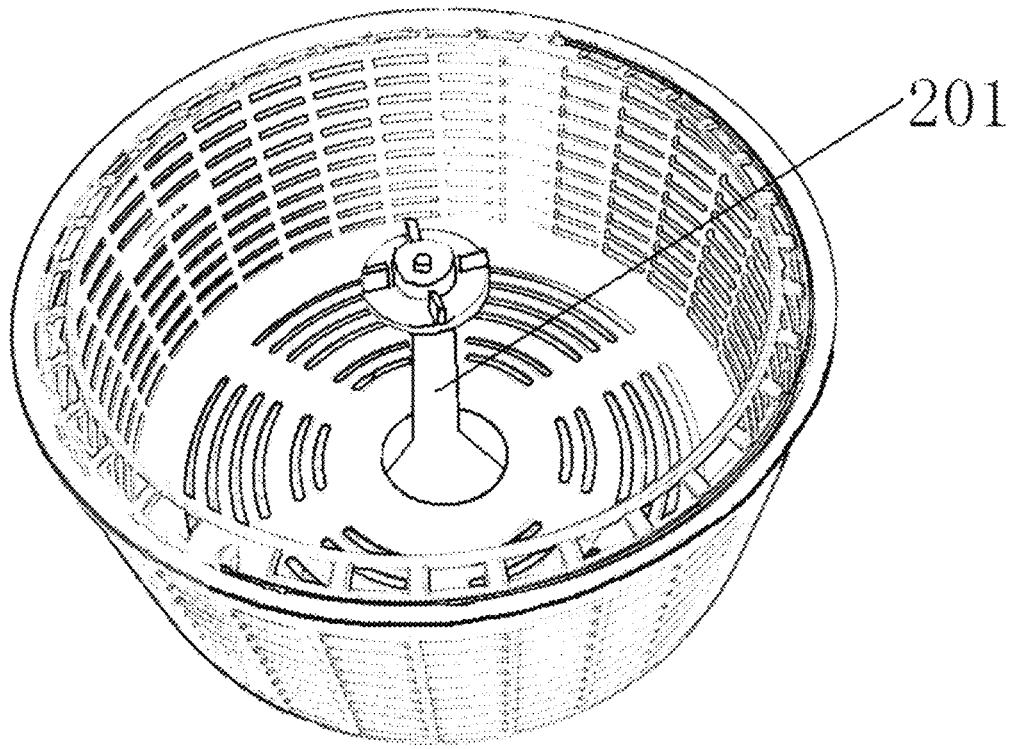
FIG. 24 is the physical picture of the structure of the basket of the vegetable washer with the power supra in existing technology.
Figure 25:
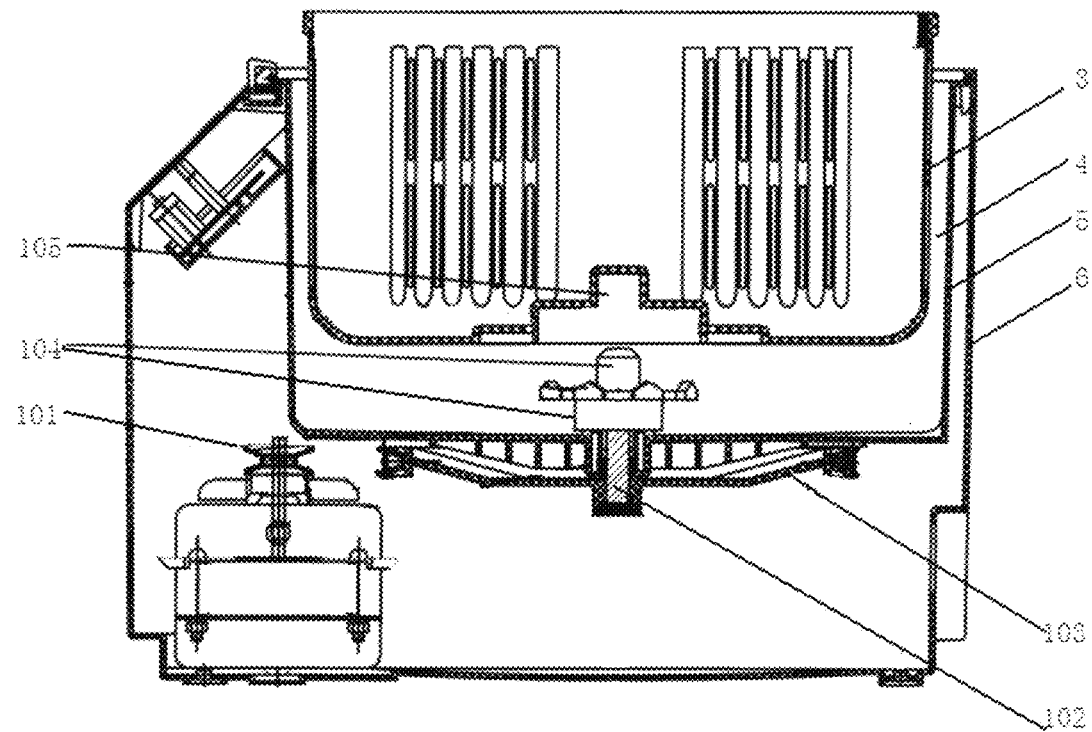
FIG. 25 is the assembling schematic diagram of the structure of the vegetable washer with the power below in existing technology.
Figure 26:
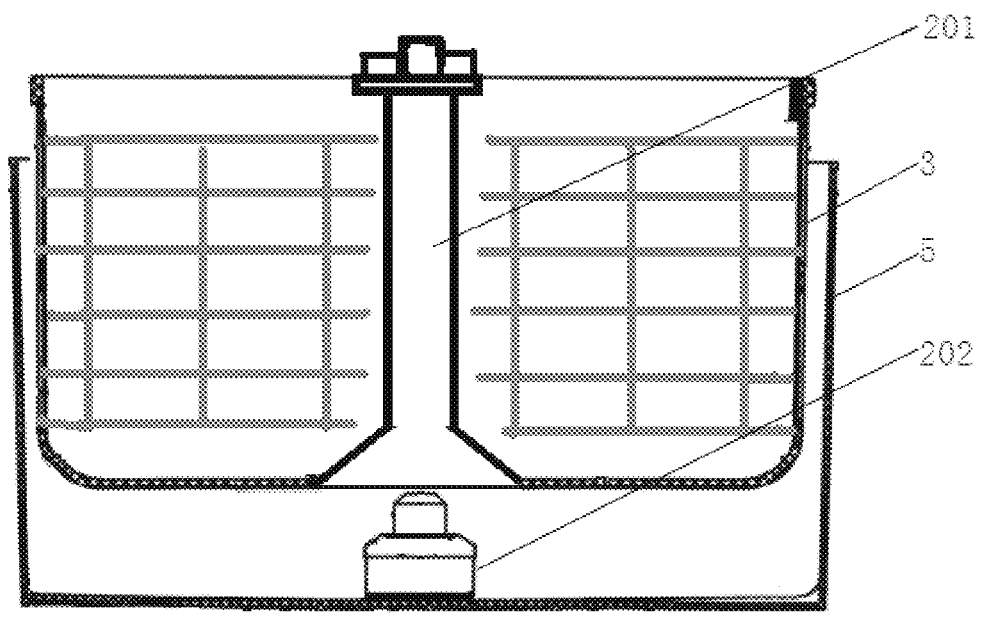
FIG. 26 is the assembling schematic diagram of the structure of the vegetable washer with the power supra in existing technology.
Figure 27:
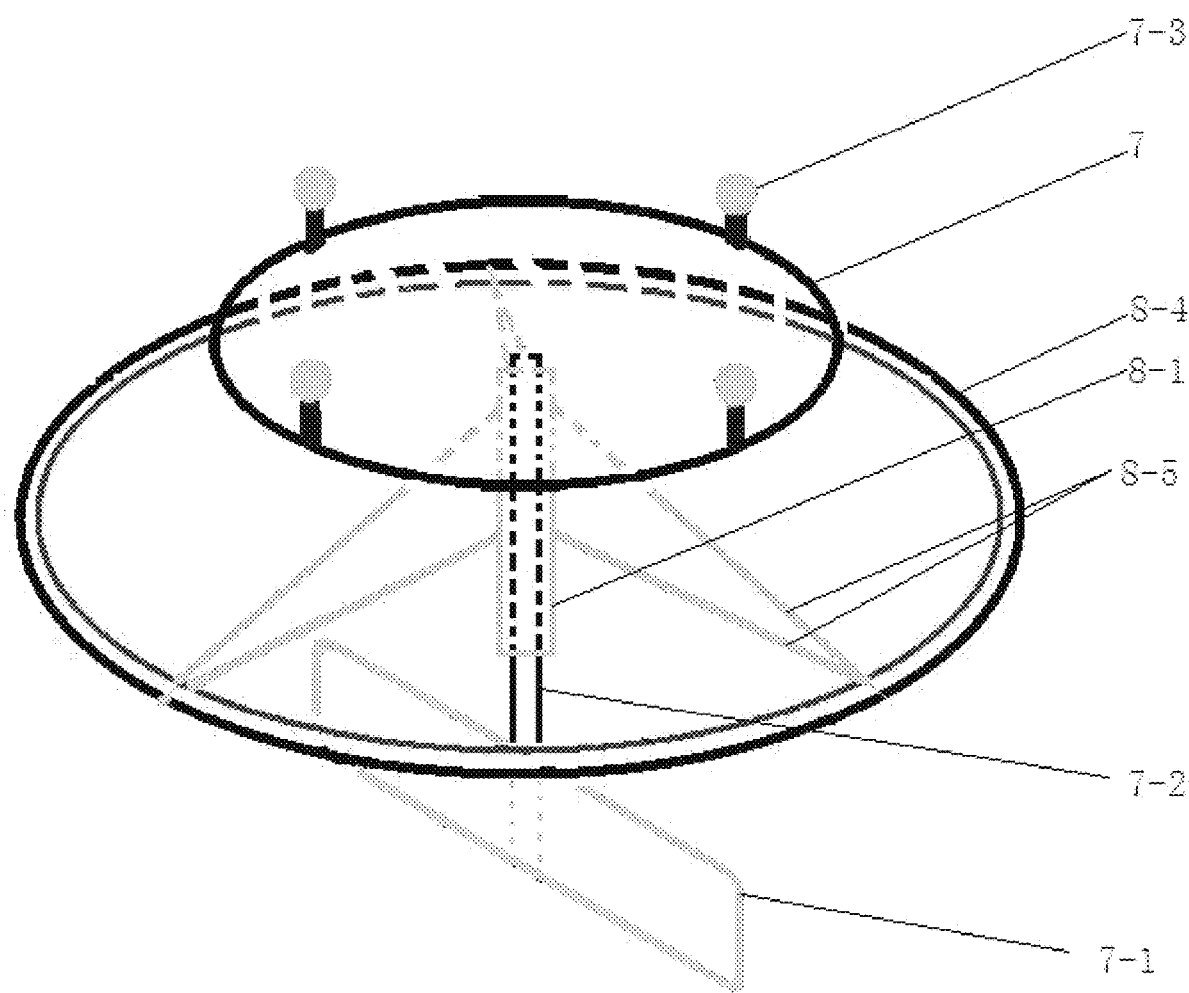
FIG. 27 is the filter under the basket, the horizontal projection area of the filter screen is more than twice the drainage outlet area, and the filter screen covers the drainage outlet; and the size of the mesh hole of the filter screen is larger than that of the drainage outlet. It has the function of preventing the passage of large volume objects such as vegetable leaves without hindering the passage and discharge of sediment. The skeleton of the filter under the basket is also used as a supporting component of the washing basket.

If allowing the instructions attached figures using photographs. I can provide the material photographs of FIG. 22. FIG. 23, FIG. 24 and FIG. 26.

According to the components of the above examples make simple recombination to produce new implementations, all of which belong to the scope of patent protection of the same transformation. And because many common parts and well-known transmission mechanism in the field of mechanical can be replaced with each other to achieve the same purpose, any of the embodiment converted out are within the scope of patent protection of the same transformation.

Now demonstrate that the vegetable washer depends mainly on the water flow spraying vegetables is a technology bias. As we all know, all the vegetable washers in the existing technology stress washing vegetables by spraying, called "spray technology", which emphasizes water returns from above and fells off in the washing-basket, and felling off in the washing-basket plays important role in washing vegetables, This can be seen from television advertising of the vegetable washer of the various manufacturers, sales page of selling vegetable washer online. But in fact, this is a technology bias. This technology bias guides people try to open the mouth of the basket, and cannot have the cover so as not to slow down the falling speed of the water flow and affect the placement of water, while the present invention is on the contrary, and filter is located in the basket's inlet, and in the dense filter accumulated a great deal of Group C impurities and some Group B impurities, objectively slowing down the flow rate and affecting the placement of water which is random and irregular. But the washing effect improved significantly. That proves that when water drops the so-called "spray" does not play a key role in washing vegetables, that is, phenomenon of water spraying does exist, but just a kind of water cycling phenomenon of dynamic vegetable washer.

Experiments show that regardless of the placement of the water in the center of the basket or around the basket that is the top of the vegetables (note: vegetables stay surrounding the basket), the washing effect is due to the friction of the gap when water goes through vegetables, rather than the sprinkling of water falling. Because fruits and vegetables are staying within the containment of water from the beginning to the end, and the falling water cannot catch in fruits and vegetables no matter where the whereabouts is. The swimmer can realize this principle most: when a man is swimming in the pool it suddenly rains heavily, his head and shoulders exposed on the surface can feel the rain, but below the surface portions such as loins and legs do not feel the rain, when his body was submerged, then no matter how heavy rain is his body cannot got caught.

Since water's placement has no effect on cleanliness of washing vegetables, the shape of the backwater plate (or called rib flap retaining bar curb retaining piece, etc.) is not important, and can be stand sheet of various shapes.

The invention claimed is:
1. A method for cleaning fruits or vegetables, comprising:
providing the fruits or vegetables to be cleaned in a washing basket; wherein the washing basket is arranged in a washing-bucket; a bottom center of the washing-bucket is provided with a drainage outlet; the drainage outlet is capable of being opened and closed; the washing-bucket and a cover of the washing-bucket is connected with a machine box; the machine box comprises a motor provided inside the cover and a control unit for initiating a rotation of the washing basket and driving the washing basket to rotate; a first filter is provided between the cover and the washing basket; the first filter comprises a central filter sleeve cooperating with an output shaft of the motor such that the first filter is driven by the motor during operation and a plurality of plugs cooperating with corresponding jacks provided on the washing basket in such a manner that the washing basket is driven to rotate along with the first filter during operation;

injecting washing water into the washing-bucket to immerse the fruits or vegetables to be cleaned and the washing basket;

starting the motor to drive the rotation of the washing basket; wherein a gap is provided between the washing bucket and the washing basket during the operation; the rotation of the washing basket agitates the washing water in the washing bucket and makes the washing water rotate upwardly; wherein a movement path of the washing water is such that the washing water within the washing basket is thrown to the gap by a centrifugal force generated by the rotation of the washing basket, and then the washing water rises to a top of the basket and is guided by a water baffle to a center of the top of the basket, and then the guided washing water falls back to the washing basket after passing through the first filter; the filtered washing water falling back to the washing basket is again thrown to the gap by the centrifugal force; a repetition of the movement path is defined as a cleaning movement cycle inside the washing bucket; wherein the washing water in every cycle passes through clearances between the fruits or vegetables to be cleaned, and has a rapid relative movement with a surface of the fruits or vegetables to be cleaned such that; impurities attached on the surface of the fruits or vegetables are removed and move along with the washing water the impurities are filtered by the first filter and retained on the first filter through the rapid relative movement; wherein during cycles of the cleaning movement, the drainage outlet at the bottom center of the washing-bucket is kept closed;

opening the drainage outlet for discharging the washing water after the cycles of the cleaning movement;

wherein the washing basket comprises a washing basket body, a supporting device for supporting the washing basket body, a positioning device for limiting a position of the washing basket body and a transmission device for coordinating the agitation of the washing water, forming a rotating upward flow and transferring a torque of the motor to the washing basket; and wherein during the cycles of the cleaning movement, the fruits or vegetables in the washing basket move centrifugally to the periphery of the washing basket and stay at the periphery of the washing basket.

2. The method for cleaning fruits or vegetables of claim 1, wherein when discharging out the washing water from the washing basket after the cycles of cleaning movement, the washing basket is kept rotating and an eddy current drainage is formed with the rotating of the washing water driven the rotating washing basket.

3. The method for cleaning fruits or vegetables of claim 2, wherein during the formation of the eddy current drainage, the fruits or vegetables in the washing basket are immersed in the washing water, thus being driven by the washing water and gathered towards a center of the washing basket.

4. The method for cleaning fruits or vegetables of claim 3, wherein after the discharging of the washing water, the drainage outlet at the bottom center of the washing-bucket is closed; the steps of injecting the washing water, cycles of cleaning movement in the washing basket, forming of the eddy current drainage and forcing the fruits or vegetables in the washing basket to move towards a center of the washing basket are repeated.

5. The method for cleaning fruits or vegetables of claim 1, wherein in order to prevent large objects including vegetable leaves and vegetable branches from entering the drainage outlet, a second filter is arranged above the drainage outlet and under the washing basket; wherein in a horizontal projection area of a filter screen, the second filter is twice more than an area of the drainage outlet; the second filter covers the drainage outlet, and the washing water permeates between the second filter screen and the bottom of the washing bucket; a mesh size of the second filter screen is configured for blocking vegetable leaves or vegetable branches and allowing sand.

6. The method for cleaning fruits or vegetables of claim 5, wherein a mesh size of the second filter screen ranges from 2 mm to 5 mm.

7. The method for cleaning fruits or vegetables of claim 5, wherein the second filter further comprises a skeleton functioning as a supporting component for the washing basket.

8. A fruits or vegetables washing machine, comprising: a washing bucket and a washing basket arranged in the washing bucket for accommodating fruits and vegetables to be cleaned;

the washing machine further comprises a machine box connected with the washing bucket and a cover of the washing bucket; the machine box comprises a motor provided inside the cover for driving the washing basket to rotate; a first filter is provided between the cover and the washing basket; the first filter comprises a central filter sleeve cooperating with an output shaft of the motor such that the first filter is driven by the motor during operation and a plurality of plugs cooperating with corresponding jacks provided on the washing basket in such a manner that the washing basket is driven to rotate along with the first filter during operation;

a gap is provided between the washing bucket and the washing basket during the operation; wherein the rotation of the washing basket agitates the washing water in the washing bucket and makes the washing water rotate upwardly; a movement path of the washing water is such that the washing water within the washing basket is thrown to the gap by a centrifugal force generated by the rotation of the washing basket, and then the washing water rises to a top of the basket and is guided by a water baffle to a center of the top of the basket, and then the guided washing water falls back to the washing basket after passing through the first filter; the filtered washing water falling back to the washing basket is again thrown to the gap by the centrifugal force; a repetition of the movement path is defined as a cleaning movement cycle inside the the washing bucket; the washing water in every cycle passes through clearances between the fruits or vegetables to be cleaned, and has a rapid relative movement with a surface of the fruits or vegetables to be cleaned; impurities attached on the surface of the fruits or vegetables are removed and move along with the washing water; the impurities are filtered by the first filter and retained on the first filter through the rapid relative movement; during cycles of the cleaning movement, a drainage outlet at the bottom center of the washing bucket is kept closed;

opening the drainage outlet for discharging the washing water after the cycles of the cleaning movement;

wherein the washing basket comprises a washing basket body, a supporting device for supporting the washing basket body, a positioning device for limiting a position of the washing basket body and a transmission device for coordinating the agitation of the washing water, forming a rotating upward flow and transferring a torque of the motor to the washing basket; and during the cycles of the cleaning movement, the fruits or vegetables in the washing basket move centrifugally to the periphery of the washing basket and stay at the periphery of the washing basket.

9. The washing machine for cleaning fruits or vegetables of claim 8, wherein when discharging out the washing water from the washing basket after the cycles of cleaning movement, the washing basket is kept rotating and an eddy current drainage is formed with the rotating of the washing water driven by the rotating washing basket.

10. The washing machine for cleaning fruits or vegetables of claim 9, wherein during the formation of the eddy current drainage, the fruits or vegetables in the washing basket are immersed in the washing water, thus being driven by the washing water and gathered towards a center of the washing basket.

11. The washing machine for cleaning fruits or vegetables of claim 8, wherein the bottom of the washing bucket is funnel-shaped.

12. The washing machine for cleaning fruits or vegetables of claim 9, wherein a second filter is arranged above the drainage outlet and under the washing basket; wherein in a horizontal projection area of a filter screen, the second filter is twice more than an area of the drainage outlet; the second filter covers the drainage outlet, and the washing water permeates between the filter screen and the bottom of the washing bucket; a mesh size of the filter screen is configured for blocking vegetable leaves or vegetable branches and allowing sand.

13. The washing machine for cleaning fruits or vegetables of claim 12, wherein a mesh size of the second filter screen ranges from 2 mm to 5 mm.

14. The washing machine for cleaning fruits or vegetables of claim 13, wherein the second filter further comprises a skeleton functioning as a supporting component for the washing basket.

* * * * *